(12) United States Patent
Huang et al.

(10) Patent No.: US 10,750,460 B2
(45) Date of Patent: Aug. 18, 2020

(54) COMMUNICATIONS METHOD AND APPARATUS FOR DETERMINING A RANDOM ACCESS ASSOCIATION PERIOD

(71) Applicant: Huawei Technologies Co., Ltd., Shenzhen (CN)

(72) Inventors: Huang Huang, Shenzhen (CN); Kuandong Gao, Chengdu (CN); Mao Yan, Chengdu (CN); Hua Shao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/662,816

(22) Filed: Oct. 24, 2019

(65) Prior Publication Data

US 2020/0059878 A1 Feb. 20, 2020

Related U.S. Application Data

(63) Continuation of application No. PCT/CN2019/071634, filed on Jan. 14, 2019.

(30) Foreign Application Priority Data

Jan. 12, 2018 (CN) .......................... 2018 1 0032285

(51) Int. Cl.
*H04W 56/00* (2009.01)
*H04W 74/02* (2009.01)
(Continued)

(52) U.S. Cl.
CPC ......... *H04W 56/001* (2013.01); *H04L 5/0007* (2013.01); *H04L 5/0094* (2013.01);
(Continued)

(58) Field of Classification Search
CPC .............................. H04W 72/0406; H04W 74/08; H04W 56/001
See application file for complete search history.

(56) References Cited

U.S. PATENT DOCUMENTS

2019/0110314 A1* 4/2019 Abedini .............. H04W 74/008

FOREIGN PATENT DOCUMENTS

WO WO2018203724 A1 * 11/2018 ............ H04W 74/08

OTHER PUBLICATIONS

Ericsson, "Remaining details on RACH procedure", 3GPP TSG RAN WG1 Meeting #91, R1-1720941, Reno, Nevada, USA, Nov. 27-Dec. 1, 2017, 24 pages.

(Continued)

*Primary Examiner* — Hoon J Chung
(74) *Attorney, Agent, or Firm* — Slater Matsil, LLP

(57) ABSTRACT

This application discloses a communications method and apparatus. The method includes: obtaining, by a terminal device, downlink synchronization signal block index information; receiving, by the terminal device, information used to indicate an association relationship between a random access resource RO and a synchronization signal block; and accessing, by the terminal device, a network device based on the information on an RO corresponding to the synchronization signal block index information. This application further discloses a corresponding apparatus. A time-frequency location of a random access resource associated with each downlink synchronization signal is indicated, so that the terminal device obtains, through downlink synchronization, a time-frequency location for sending an uplink random access signal, to avoid a blind attempt of the terminal device and a beam mismatch of the network device occurring when the network device receives a random access signal, thereby improving efficiency.

31 Claims, 15 Drawing Sheets

(51) Int. Cl.
*H04W 74/08* (2009.01)
*H04L 5/00* (2006.01)
*H04W 72/04* (2009.01)

(52) U.S. Cl.
CPC ......... *H04W 72/046* (2013.01); *H04W 74/02* (2013.01); *H04W 74/0833* (2013.01)

(56) References Cited

OTHER PUBLICATIONS

Samsung, "Remaining details on PRACH procedure", 3GPP TSG RAN WG1 Meeting 91, R1-1720278, Reno, USA, Nov. 27-Dec. 1, 2017, 18 pages.

3GPP TS 38.213 V15.0.0 (Dec. 2017); 3rd Generation Partnership Project; Technical Specification Group Radio Access Network; NR; Physical layer procedures for control (Release 15); 56 pages.

Huawei et al., "Remaining issues in RACH Procedure", 3GPP TSG RAN WG1 Meeting #91, R1-1719501, Reno, USA, Nov. 27-Dec. 1, 2017, 11 pages.

3GPP TS 38.211 V15.0.0 (Dec. 2017); 3rd Generation Partnership Project; Technical Specification Group Radio Access Network; NR; Physical channels and modulation (Release 15); 73 pages.

Zte et al., "Remaining details of RACH procedure", 3GPP TSG RAN WG1 Meeting #91, R1-1719346, Reno, USA, Nov. 27-Dec. 1, 2017, 30 pages.

Qualcomm Incorporated, "Remaining Details on RACH Procedure", 3GPP TSG-RAN WG1 Meeting #91, R1-1720653, Reno, Nevada, USA, Nov. 27-Dec. 2, 2017, 22 pages.

Zte, "WF on random access association configuration," 3GPP R1-171179TSG RAN WG1 NR Ad-Hoc#2, Jun. 27-30, 2017, XP051306018, 14 pages, Qingdao, CN.

Ericsson, "Remaining details on NR-RACH formats and configurations," 3GPP TSG RAN WG1 Meeting #91, R1-1720940, Nov. 1-18, 2017, XP051370314, 30 pages, Reno, NV, USA.

Qualcomm, "Summary of Remaining Details on RACH Procedure," 3GPP TSG RAN WGl, R1-1721689, Nov. 27, 2017-Dec. 1, 2017, XP051370768, 45 pages, Reno, NV, USA.

\* cited by examiner

US 10,750,460 B2

COMMUNICATIONS METHOD AND APPARATUS FOR DETERMINING A RANDOM ACCESS ASSOCIATION PERIOD

CROSS-REFERENCE TO RELATED APPLICATIONS

This application is a continuation of International Application No. PCT/CN2019/071634, filed on Jan. 14, 2019, which claims priority of Chinese Patent Application No. 201810032285.5, filed on Jan. 12, 2018. The disclosures of the aforementioned applications are hereby incorporated herein by reference in their entireties.

TECHNICAL FIELD

This application relates to the field of communications technologies, and in particular, to a communications method and apparatus.

BACKGROUND

Before communicating with a terminal device, a base station first needs to perform uplink and downlink synchronization. During the downlink synchronization, the base station sends downlink synchronization signals by using a plurality of transmit beams. The terminal device receives and detects the downlink synchronization signals by using one or more receive beams, to obtain an optimal downlink transmit and receive beam pair, time information, and system information. The uplink synchronization is completed with help of a random access process. The terminal device first sends a random access signal. The base station detects the random access signal to obtain an optimal uplink transmit and receive beam pair, an uplink time, and the like, and to finally implement the uplink synchronization between the base station and the terminal device.

In a New Radio (NR) communications system, different random access resources may be in association relationships with different beams, or a base station uses different beams to receive uplink signals on different random access resources. Therefore, different beams of the base station may have different base station coverage areas. Terminal devices send uplink signals or receive downlink signals in different areas. The uplink signals received by the base station or the downlink signals received by the terminal devices have different demodulation or detection performance. As shown in FIG. 1, when a terminal device sends an uplink signal in a beam direction aligned with an area in which the terminal device is located, a signal received by the base station has best demodulation or detection performance; or when a terminal device sends an uplink signal in a beam direction non-aligned with an area in which the terminal device is located, a signal received by the base station has relatively poor demodulation or detection performance. Therefore, when implementing the uplink synchronization between the base station and the terminal device, the terminal device needs to select a suitable or an optimal base station receive beam to send an uplink signal or an optimal base station transmit beam receive a downlink signal in the random access process.

When the terminal device performs an initial access process, the terminal device first obtains beam information from a downlink synchronization signal block. Therefore, the downlink synchronization signal block should be in an association relationship with a random access resource. However, no solution for associating a downlink synchronization signal block with a random access resource is provided.

SUMMARY

This application provides a communications method and apparatus, to resolve a problem about how to associate a downlink synchronization signal block with a random access resource.

According to an aspect of this application, a communications method is provided, including: obtaining, by a terminal device, downlink synchronization signal block index information; receiving, by the terminal device, information used to indicate an association relationship between one or more random access occasions (ROs) and a synchronization signal block; and accessing, by the terminal device, a network device based on the information on an RO corresponding to the synchronization signal block index information; where the association relationship between an RO and a synchronization signal block is at least one of the following: a quantity of synchronization signal blocks associated with one RO is at least 1/F, or is P at most, where F is a quantity of ROs in frequency domain, and P is related to a quantity of actually transmitted synchronization signal blocks; and/or N synchronization signal blocks or N synchronization signal block groups are associated with one RO in frequency domain or are associated with all ROs in frequency domain; and/or the first random access channel (RACH) resources in every X RACH resource configuration periods Y are associated with same synchronization signal blocks when one random access resource configuration period is P, where P and X are integers and Y is equal to P multiplied by X. The terminal device may obtain the downlink synchronization signal block index information in the following manner: The terminal device receives a downlink synchronization signal block, where the downlink synchronization signal block carries index information. In this aspect, a time-frequency location of a random access resource associated with each downlink synchronization signal is indicated, so that the terminal device obtains, through downlink synchronization, a time-frequency location for sending an uplink random access signal, to avoid a blind attempt of the terminal device and a beam mismatch of the network device occurring when the network device receives a random access signal, thereby improving efficiency.

In a possible implementation, when the association relationship is that N synchronization signal blocks or N synchronization signal block groups are associated with one RO in frequency domain or are associated with all ROs in frequency domain, the method further includes: receiving, by the terminal device, indication information from the network device, where the indication information is used to indicate that the N synchronization signal blocks or the N synchronization signal block groups are associated with one RO in frequency domain, or is used to indicate that the N synchronization signal blocks or the N synchronization signal block groups are associated with all the ROs in frequency domain.

In another possible implementation, when one random access resource configuration period is P, and the first RACH resources in every X RACH resource configuration periods are associated with same synchronization signal blocks, X is received from the network device or is prestored; and/or Y is received from the network device or is prestored.

In still another possible implementation, a value of Y is 10 ms, 20 ms, 40 ms, 80 ms, 160 ms, 320 ms, or 640 ms.

In yet another possible implementation, a value of X is related to a quantity of synchronization signal blocks, or a value of X is related to a quantity of random access resources in one random access resource configuration period, or a value of X is 1, 2, 4, 8, or 16.

In still yet another possible implementation, when one random access resource configuration period is P, and the first random access resources in every X random access resource configuration periods are associated with same synchronization signal blocks, if there are one or more remaining random access resources, the terminal device does not access the network device on the remaining random access resource.

In a further possible implementation, when one random access resource configuration period is P, and the first random access resources in every X random access resource configuration periods are associated with same synchronization signal blocks, if there are one or more remaining random access resources, the one or more remaining random access resources are associated starting from the first synchronization signal block or the last synchronization signal block or a next synchronization signal block of an end synchronization signal block in previous X periods, or any one or more of the foregoing three association relationships are used in different X periods.

In a still further possible implementation, when the association relationship is that N synchronization signal blocks or N synchronization signal block groups are associated with one RO in frequency domain or are associated with all ROs in frequency domain, if a quantity N of actually transmitted synchronization signal blocks or synchronization signal block groups cannot be exactly divided by a quantity, configured by the network device, of synchronization signal blocks associated with one RO, after a quantity of synchronization signal blocks or synchronization signal block groups are associated with a corresponding RO, where the quantity is an integer multiple of the quantity configured by the network device, a remaining synchronization signal block or downlink synchronization signal block group is associated with another one or more ROs. N is 1 or above.

In a yet further possible implementation, a quantity of random access resources in a random access resource configuration period or a random access resource association period is related to a quantity of synchronization signal blocks or synchronization signal block groups.

Correspondingly, a communications apparatus is provided and can implement the foregoing communications method. For example, the communications apparatus may be a chip (such as a baseband chip or a communications chip) or a device (such as a terminal device). The communications apparatus may implement the foregoing method by using software or hardware, or by using hardware executing corresponding software.

In a possible implementation, a structure of the communications apparatus includes a processor and a memory. The processor is configured to support the apparatus in executing a corresponding function in the foregoing communications method. The memory is configured to couple with the processor, and the memory stores a program (an instruction) and/or data necessary for the apparatus. Optionally, the communications apparatus may further include a communications interface, configured to support communication between the apparatus and another network element.

In another possible implementation, the communications apparatus may include a receiving unit and a processing unit. The receiving unit is configured to implement a receiving function in the foregoing method. The processing unit is configured to implement a processing function in the foregoing method. For example, the receiving unit is configured to receive a downlink signal, where the downlink signal carries downlink synchronization signal block index information. The receiving unit is further configured to receive information used to indicate an association relationship between a random access occasion RO and a synchronization signal block. The processing unit is configured to obtain the synchronization signal block index information and the association relationship between a random access occasion RO and a synchronization signal block from the receiving unit, and access a network device on an RO corresponding to the synchronization signal block index information. The association relationship between an RO and a synchronization signal block is at least one of the following: a quantity of synchronization signal blocks associated with one RO is at least 1/F, or is P at most, where F is a quantity of ROs in frequency domain, and P is related to a quantity of actually transmitted synchronization signal blocks; and/or N synchronization signal blocks or N synchronization signal block groups are associated with one RO in frequency domain or are associated with all ROs in frequency domain; and/or first RACH resources in every X RACH resource configuration periods Y are associated with same synchronization signal blocks when one random access resource configuration period is P, where P and X are integers and Y is equal to P multiplied by X. The processing unit may obtain the synchronization signal block index information in the following manner: The receiving unit receives a synchronization signal block, where the synchronization signal block carries index information, and the processing unit obtains the index information of the synchronization signal block from the receiving unit.

When the communications apparatus is a chip, the receiving unit may be an input unit, for example, an input circuit or an input communications interface; and a sending unit may be an output unit, for example, an output circuit or an output communications interface. When the communications apparatus is a device, the receiving unit may be a receiver; and the sending unit may be a transmitter.

According to another aspect of this application, a communications method is provided, including: sending, by a network device, downlink synchronization signal block index information to a terminal device; sending, by the network device to the terminal device, information used to indicate an association relationship between a random access resource RO and a synchronization signal block; and receiving, by the network device, a random access signal that is sent by the terminal device on an RO corresponding to the synchronization signal block index information. In this aspect, a time-frequency location of a random access resource associated with each downlink synchronization signal is indicated, so that the terminal device obtains, through downlink synchronization, a time-frequency location for sending an uplink random access signal, to avoid a blind attempt of the terminal device and a beam mismatch of the network device occurring when the network device receives a random access signal, thereby improving efficiency.

Correspondingly, a communications apparatus is provided and can implement the foregoing communications method. For example, the communications apparatus may be a chip (such as a baseband chip or a communications chip) or a device (such as a network device or a baseband processing board). The communications apparatus may implement the foregoing method by using software or hardware, or by using hardware executing corresponding software.

In a possible implementation, a structure of the communications apparatus includes a processor and a memory. The processor is configured to support the apparatus in executing a corresponding function in the foregoing communications method. The memory is configured to couple with the processor, and the memory stores a program (an instruction) and data necessary for the apparatus. Optionally, the communications apparatus may further include a communications interface, configured to support communication between the apparatus and another network element.

In another possible implementation, the communications apparatus may include a receiving unit and a sending unit. The receiving unit and the sending unit are configured to respectively implement a receiving function and a sending function in the foregoing method. For example, the sending unit is configured to send downlink synchronization signal block index information to a terminal device. The sending unit is further configured to send, to the terminal device, information used to indicate an association relationship between a random access resource RO and a synchronization signal block. The receiving unit is configured to receive a random access signal that is sent by the terminal device on an RO corresponding to the synchronization signal block index information.

When the communications apparatus is a chip, the receiving unit may be an input unit, for example, an input circuit or an input communications interface; and the sending unit may be an output unit, for example, an output circuit or an output communications interface. When the communications apparatus is a device, the receiving unit may be a receiver; and the sending unit may be a transmitter.

According to still another aspect of this application, a communications method is provided, including: receiving, by a terminal device, first information and/or second information sent by a network device, where the first information is used to instruct to send a first uplink signal on a first time-frequency resource; and/or the second information is used to instruct to send a second uplink signal on a second time-frequency resource; and when a third time-frequency resource in the first time-frequency resource indicated by the first information is included in the second time-frequency resource indicated by the second information, sending, by the terminal device, the first uplink signal to the network device on a time-frequency resource other than the third time-frequency resource in the first time-frequency resource; or when a fourth time-frequency resource in the second time-frequency resource indicated by the second information is included in the first time-frequency resource indicated by the first information, sending, by the terminal device, the second uplink signal to the network device on a time-frequency resource other than the fourth time-frequency resource in the second time-frequency resource; or when a third time-frequency resource in the first time-frequency resource indicated by the first information overlaps a fourth time-frequency resource in the second time-frequency resource indicated by the second information, sending, by the terminal device, the first uplink signal to the network device on the first time-frequency resource, and/or sending, by the terminal device, the second uplink signal to the network device on the second time-frequency resource. In this aspect, the terminal device sends an uplink signal based on time-frequency resource indication information. In this way, a time-frequency resource conflict between uplink signals can be avoided and signal receiving performance is improved.

In a possible implementation, the first uplink signal is at least one of the following: a periodic signal, a semi-static signal, a semi-persistent signal, a periodic sounding reference signal, a periodic demodulation reference signal, a periodic physical uplink shared channel signal, a periodic physical uplink control channel signal, and a dynamic scheduling/configuration signal; and the second uplink signal is a random access signal.

In another possible implementation, the receiving, by a terminal device, first information and/or second information sent by a network device specifically includes: receiving, by the terminal device by using at least one type of the following information, the first information and/or the second information sent by the network device, where the at least one type of the following information includes: system information, radio resource control signaling, a downlink control channel, and a Media Access Control control element (MAC CE).

In still another possible implementation, the method further includes: receiving, by the terminal device, third information, where the third information includes an uplink signal transmission precoding type, and the uplink signal transmission precoding type includes a first type and a second type; and sending, by the terminal device, an uplink signal to the network device based on the first information, the second information, and the third information.

In yet another possible implementation, the method further includes: when the uplink signal transmission precoding type is the first type, and/or the third time-frequency resource in the first time-frequency resource indicated by the first information overlaps the fourth time-frequency resource in the second time-frequency resource indicated by the second information, sending, by the terminal device, the first uplink signal to the network device on the first time-frequency resource, and/or sending, by the terminal device, the second uplink signal to the network device on the second time-frequency resource; or when the uplink signal transmission precoding type is the second type, and the third time-frequency resource in the first time-frequency resource indicated by the first information is included in the second time-frequency resource indicated by the second information, sending, by the terminal device, the first uplink signal to the network device on a time-frequency resource other than the third time-frequency resource in the first time-frequency resource; or when the uplink signal transmission precoding type is the second type, and the fourth time-frequency resource in the second time-frequency resource indicated by the second information is included in the first time-frequency resource indicated by the first information, sending, by the terminal device, the second uplink signal to the network device on a time-frequency resource other than the fourth time-frequency resource in the second time-frequency resource.

Correspondingly, a communications apparatus is provided and can implement the foregoing communications method. For example, the communications apparatus may be a chip (such as a baseband chip or a communications chip) or a device (such as a terminal device). The communications apparatus may implement the foregoing method by using software or hardware, or by using hardware executing corresponding software.

In a possible implementation, a structure of the communications apparatus includes a processor and a memory. The processor is configured to support the apparatus in executing a corresponding function in the foregoing communications method. The memory is configured to couple with the processor, and the memory stores a program (an instruction) and/or data necessary for the apparatus. Optionally, the communications apparatus may further include a communications interface, configured to support communication between the apparatus and another network element.

In another possible implementation, the communications apparatus may include a sending unit, a receiving unit, and a processing unit. The sending unit and the receiving unit are configured to respectively implement a sending function and a receiving function in the foregoing method. The processing unit is configured to implement a processing function in the foregoing method. For example, the receiving unit is configured to receive first information and/or second information sent by a network device, where the first information is used to instruct to send a first uplink signal on a first time-frequency resource; and/or the second information is used to instruct to send a second uplink signal on a second time-frequency resource; and the sending unit is configured to: when a third time-frequency resource in the first time-frequency resource indicated by the first information is included in the second time-frequency resource indicated by the second information, send the first uplink signal to the network device on a time-frequency resource other than the third time-frequency resource in the first time-frequency resource; or further configured to: when a fourth time-frequency resource in the second time-frequency resource indicated by the second information is included in the first time-frequency resource indicated by the first information, send the second uplink signal to the network device on a time-frequency resource other than the fourth time-frequency resource in the second time-frequency resource; or further configured to: when a third time-frequency resource in the first time-frequency resource indicated by the first information overlaps a fourth time-frequency resource in the second time-frequency resource indicated by the second information, send the first uplink signal to the network device on the first time-frequency resource, and/or send the second uplink signal to the network device on the second time-frequency resource.

When the communications apparatus is a chip, the receiving unit may be an input unit, for example, an input circuit or an input communications interface; and the sending unit may be an output unit, for example, an output circuit or an output communications interface. When the communications apparatus is a device, the receiving unit may be a receiver; and the sending unit may be a transmitter.

According to yet another aspect of this application, a communications method is provided, including: sending, by a network device, first information and/or second information to a terminal device, where the first information is used to instruct to send a first uplink signal on a first time-frequency resource; and/or the second information is used to instruct to send a second uplink signal on a second time-frequency resource; and when a third time-frequency resource in the first time-frequency resource indicated by the first information is included in the second time-frequency resource indicated by the second information, receiving, by the network device, the first uplink signal that is sent by the terminal device on a time-frequency resource other than the third time-frequency resource in the first time-frequency resource; or when a fourth time-frequency resource in the second time-frequency resource indicated by the second information is included in the first time-frequency resource indicated by the first information, receiving, by the network device, the second uplink signal that is sent by the terminal device on a time-frequency resource other than the fourth time-frequency resource in the second time-frequency resource; or when a third time-frequency resource in the first time-frequency resource indicated by the first information overlaps a fourth time-frequency resource in the second time-frequency resource indicated by the second information, receiving, by the network device, the first uplink signal that is sent by the terminal device on the first time-frequency resource, and/or receiving, by the network device, the second uplink signal that is sent by the terminal device on the second time-frequency resource. In this aspect, the terminal device sends an uplink signal based on time-frequency resource indication information. In this way, a time-frequency resource conflict between uplink signals can be avoided and signal receiving performance of the network device is improved.

In a possible implementation, the method further includes: sending, by the network device, third information to the terminal device, where the third information includes an uplink signal transmission precoding type, and the uplink signal transmission precoding type includes a first type and a second type; and receiving, by the network device, an uplink signal that is sent by the terminal device based on the first information, the second information, and the third information.

In another possible implementation, the method further includes: when the uplink signal transmission precoding type is the first type, and/or the third time-frequency resource in the first time-frequency resource indicated by the first information overlaps the fourth time-frequency resource in the second time-frequency resource indicated by the second information, receiving, by the network device, the first uplink signal that is sent by the terminal device on the first time-frequency resource, and/or receiving, by the network device, the second uplink signal that is sent by the terminal device on the second time-frequency resource; or when the uplink signal transmission precoding type is the second type, and the third time-frequency resource in the first time-frequency resource indicated by the first information is included in the second time-frequency resource indicated by the second information, receiving, by the network device, the first uplink signal that is sent by the terminal device on a time-frequency resource other than the third time-frequency resource in the first time-frequency resource; or when the uplink signal transmission precoding type is the second type, and the fourth time-frequency resource in the second time-frequency resource indicated by the second information is included in the first time-frequency resource indicated by the first information, receiving, by the network device, the second uplink signal that is sent by the terminal device on a time-frequency resource other than the fourth time-frequency resource in the second time-frequency resource.

Correspondingly, a communications apparatus is provided and can implement the foregoing communications method. For example, the communications apparatus may be a chip (such as a baseband chip or a communications chip) or a device (such as a network device or a baseband processing board). The communications apparatus may implement the foregoing method by using software or hardware, or by using hardware executing corresponding software.

In a possible implementation, a structure of the communications apparatus includes a processor and a memory. The processor is configured to support the apparatus in executing a corresponding function in the foregoing communications method. The memory is configured to couple with the processor, and the memory stores a program (an instruction) and data necessary for the apparatus. Optionally, the communications apparatus may further include a communications interface, configured to support communication between the apparatus and another network element.

In another possible implementation, the communications apparatus may include a receiving unit and a sending unit. The receiving unit and the sending unit are configured to respectively implement a receiving function and a sending function in the foregoing method. For example, the sending unit is configured to send first information and/or second information to a terminal device, where the first information is used to instruct to send a first uplink signal on a first time-frequency resource; and/or the second information is used to instruct to send a second uplink signal on a second time-frequency resource; and when a third time-frequency resource in the first time-frequency resource indicated by the first information is included in the second time-frequency resource indicated by the second information, the receiving unit is configured to receive the first uplink signal that is sent by the terminal device on a time-frequency resource other than the third time-frequency resource in the first time-frequency resource; or when a fourth time-frequency resource in the second time-frequency resource indicated by the second information is included in the first time-frequency resource indicated by the first information, the receiving unit is further configured to receive the second uplink signal that is sent by the terminal device on a time-frequency resource other than the fourth time-frequency resource in the second time-frequency resource; or when a third time-frequency resource in the first time-frequency resource indicated by the first information overlaps a fourth time-frequency resource in the second time-frequency resource indicated by the second information, the receiving unit is further configured to receive the first uplink signal that is sent by the terminal device on the first time-frequency resource, and/or the receiving unit is further configured to receive the second uplink signal that is sent by the terminal device on the second time-frequency resource.

When the communications apparatus is a chip, the receiving unit may be an input unit, for example, an input circuit or an input communications interface; and the sending unit may be an output unit, for example, an output circuit or an output communications interface. When the communications apparatus is a device, the receiving unit may be a receiver; and the sending unit may be a transmitter.

According to still yet another aspect of this application, a computer-readable storage medium is provided. The computer-readable storage medium stores an instruction, and when the instruction is run on a computer, the computer is enabled to perform the method according to the foregoing aspects.

According to a further aspect of this application, a computer program product including an instruction is provided, and when the computer program product is run on a computer, the computer is enabled to perform the method according to the foregoing aspects.

BRIEF DESCRIPTION OF THE DRAWINGS

To describe the technical solutions in the embodiments of this application or in the background more clearly, the following briefly describes the accompanying drawings required for describing the embodiments of this application or the background.

DETAILED DESCRIPTION OF ILLUSTRATIVE EMBODIMENTS

The following describes embodiments of this application with reference to the accompanying drawings in the embodiments of this application.

Figure 1:
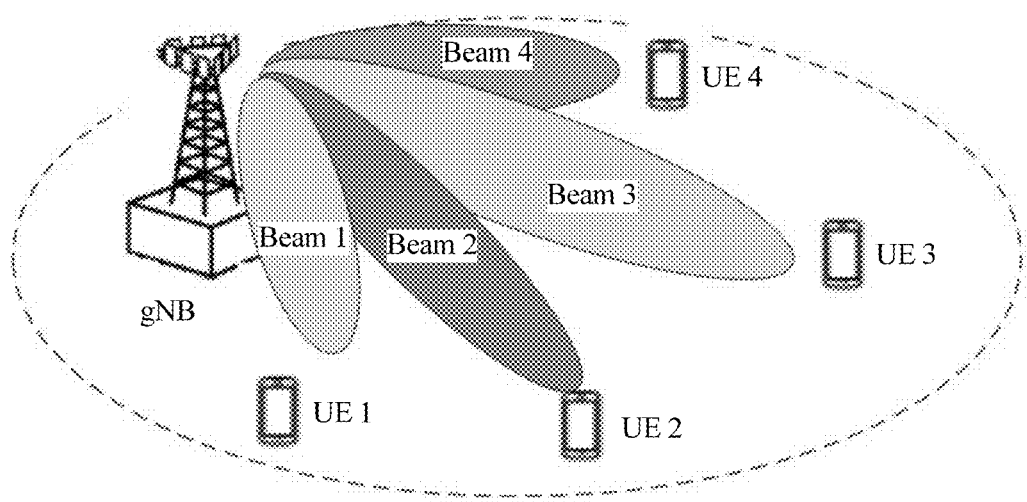
FIG. 1 is a schematic diagram of a communications system to which this application is applicable.

As shown in a schematic diagram of a communications system in FIG. 1, a solution in this application is applicable to the communications system. The communications system may include at least one network device (only one network device is shown, for example, a gNB in the figure) and one or more terminal devices connected to the network device (four UEs are shown in the figure: UE1 to UE4).

The network device may be a device that can communicate with the terminal device. The network device may be any device with a wireless sending and receiving function. The network device includes but is not limited to a base station (for example, a NodeB, an evolved NodeB (eNodeB), a base station in a 5th generation (5G) communications system, a base station or a network device in a future communications system, or an access node, a wireless relay node, or a wireless backhaul node in a Wi-Fi system). Alternatively, the network device may be a radio controller in a cloud radio access network (CRAN) scenario. Alternatively, the network device may be a network device in a 5G network or a network device in a future evolved network; or may be a wearable device, an in-vehicle device, or the like. Alternatively, the network device may be a small cell, a transmission node (transmission reception point, TRP), or the like. Certainly, this application is not limited thereto.

The terminal device is a device with a wireless sending and receiving function. The terminal device may be deployed on land and includes an indoor or outdoor device, a hand-held device, a wearable device, or an in-vehicle device, may be deployed on a water surface (for example, a ship), or may be deployed in the air (for example, an airplane, a balloon, or a satellite). The terminal device may be a mobile phone (mobile phone), a tablet computer (Pad), a computer having a wireless sending and receiving function, a virtual reality (VR) terminal device, an augmented reality (AR) terminal device, a wireless terminal related to industrial control, a wireless terminal related to self-driving, a wireless terminal related to remote medical, a wireless terminal related to a smart grid, a wireless terminal related to transportation safety, a wireless terminal related to a smart city, a wireless terminal related to a smart home, or the like. An application scenario is not limited in the embodiments of this application. Sometimes, the terminal device may alternatively be referred to as user equipment (UE), an access terminal device, a UE unit, a UE station, a mobile station, a mobile console, a remote station, a remote terminal device, a mobile device, a UE terminal device, a terminal device, a terminal, a wireless communications device, a UE agent, a UE apparatus, or the like.

It should be noted that the terms "system" and "network" may be used interchangeably in the embodiments of this application. The term "a plurality of" means two or more than two. In view of this, the term "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" usually represents an "or" relationship between the associated objects unless otherwise specified.

As shown in FIG. 1, a base station implements cell coverage by using a plurality of beams. The base station needs a suitable beam direction to communicate with a terminal device, for example, to receive a random access preamble signal or send a random access response. In a downlink synchronization process, the terminal device may obtain a base station transmit beam and a terminal receive beam for sending a downlink signal. In a sending and receiving process of an uplink random access signal, the base station may obtain a signal sent in an uplink and a base station receive beam. An association relationship exists between a downlink signal and a random access resource/preamble to improve efficiency.

The embodiments of this application provide a communications method and apparatus. A time-frequency location of a random access resource associated with each downlink synchronization signal is indicated, so that a terminal device obtains, through downlink synchronization, a time-frequency location for sending an uplink random access signal, to avoid a blind attempt of the terminal device and a beam mismatch of a network device occurring when the network device receives a random access signal, thereby improving efficiency.

Figure 2A:
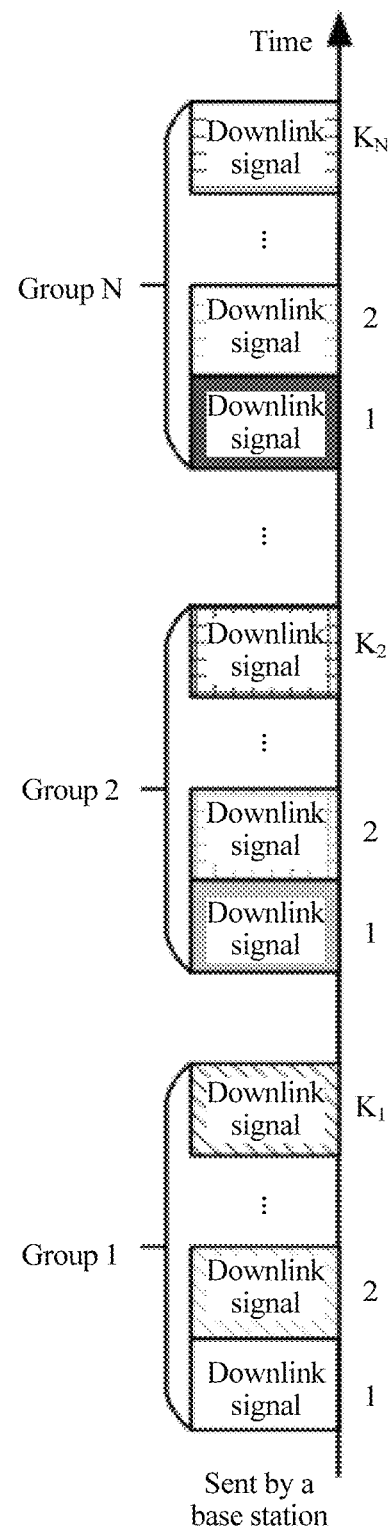
FIG. 2a is a schematic diagram of sending of downlink signals.

FIG. 2*a* is a schematic diagram of sending of downlink signals. The downlink signals are sent in a time division manner. To be specific, different downlink signals are sent at different times. For example, a downlink signal is a downlink synchronization signal block (SS/PBCH block), and the synchronization signal block is identified by using a synchronization signal block index SS/PBCH block index. The downlink signal may be one or more synchronization signal blocks.

Figure 2B:
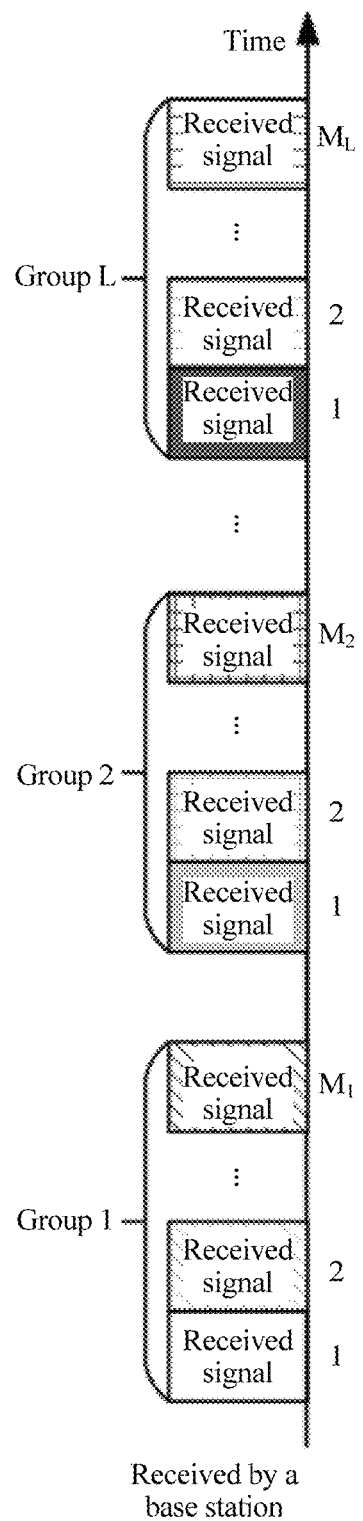
FIG. 2b is a schematic diagram of random access signal receiving performed through time division.

FIG. 2*b* is a schematic diagram of random access signal receiving performed through time division. To be specific, random access signals (associated with different downlink signals) are received at different times. Random access signals in a plurality of directions may be separately received at a same time based on an implementation capability of a network device (for example, the network device first uses antenna elements in an antenna array to receive signals in various directions, and uses digital-domain beamforming to generate a plurality of receive beams and obtain signals in directions of the receive beams).

In this application, for ease of description, a random access resource or a random access resource preamble is referred to as a "random access resource/preamble" for short. In other words, the random access resource includes time and frequency resources used for random access and a set/subset of random access preambles on random access time and frequencies resources. A random access occasion (RACH occasion/RACH transmission occasion/RACH opportunity/RACH chance/PRACH occasion, RO for short) is time and frequency resources for sending one random access preamble. A random access resource may be an RO, or one random access preamble set on an RO, or a combination of a random access preamble and a timing. A terminal device can send one random access preamble signal on this resource.

"Fixed" in this application means stipulated by a protocol or agreed on between a network device and a terminal device.

An index in this application starts from 0, or may start from 1 in an actual situation. When the index starts from 1, an index starting from 0 is automatically incremented by 1.

The RO resource in this application represents a time resource and a frequency resource of a random access timing.

A synchronization signal block (SS/PBCH block) in this application is referred to as an SSB for short, and a synchronization signal block group (SS/PBCH block group) is referred to as an SSB group for short. One SSB group includes one or more SSBs.

For ease of description, descriptions of a random access occasion (RO), a synchronization signal block (SS/PBCH block or SSB), and a synchronization signal block group (SS/PBCH block group, or SSB group) are intended to indicate one or above, instead of a limitation to only one, unless a quantity of random access occasions, a quantity of synchronization signal blocks, or a quantity of synchronization signal block groups is otherwise explicitly emphasized.

This application provides four methods for assigning a serial number for a synchronization signal block (SS/PBCH block, SSB). The serial number may sometimes be referred to as an index, used to identify the SSB.

In a first numbering method, all actually transmitted SSBs are numbered, without differentiating between actually transmitted synchronization signal block groups (SS/PBCH block group, SSB group for short). For example, 49 SSBs are actually transmitted, and the 49 SSBs are numbered 0 to 48.

In a second numbering method, an actually transmitted SSB group and an SSB inside the actually transmitted SSB group are separately numbered for expression. For example, 8 SSB groups are actually transmitted, and the 8 SSB groups are numbered 0 to 7. SSBs in each SSB group also have serial numbers. For example, an SSB group has 8 SSBs, and the 8 SSBs are numbered 0 to 7.

In a third numbering method, all possibly transmitted SSBs are numbered, without differentiating between possibly transmitted SSB groups. For example, if 64 SSBs are possibly transmitted, the SSBs are numbered 0 to 63.

In a fourth numbering method, a possibly transmitted SSB group and an SSB inside the possibly transmitted SSB group are separately numbered for expression. For example, there are 9 SSB groups and the 9 SSB groups are numbered 0 to 8. SSBs in each possibly transmitted SSB group also have serial numbers. For example, an SSB group has 9 SSBs, and the 9 SSBs are numbered 0 to 8.

The foregoing synchronization signal block may be a synchronization signal block in a half-frame for transmitting a synchronization signal block. It should be noted that, the synchronization signal block or synchronization signal block group mentioned in this application may be a possibly transmitted synchronization signal block or synchronization signal block group, or may be an actually transmitted synchronization signal block or synchronization signal block group. There may be one or more possibly transmitted synchronization signal blocks or synchronization signal block groups. There may be one or more actually transmitted synchronization signal blocks or synchronization signal block groups.

Configuring information by a network device or a base station mentioned in this application may be performed by using at least one of an MIB, remaining minimum system information (RMSI), system information block (SIB)1, SIB2, downlink control information (downlink control information, DCI), radio resource control (RRC) signaling, and a Media Access Control control element (MAC-CE).

A group, a set, and a category mentioned in this application are different expressions of a same concept.

A random access preamble group mentioned in this application may be a random access preamble direct subset, or may mean the following: P random access preamble sequences are mapped to different synchronization signal blocks or mapped to different synchronization signal block groups, and a quantity of groups thereof or a quantity of subsets thereof is related to a quantity of synchronization signal blocks or related to a quantity of synchronization signal block groups.

Mod indicates calculating a remainder, floor indicates rounding down to a nearest integer, and ceil indicates rounding up to a nearest integer.

Meanings of mapping and association are the same.

Figure 3:
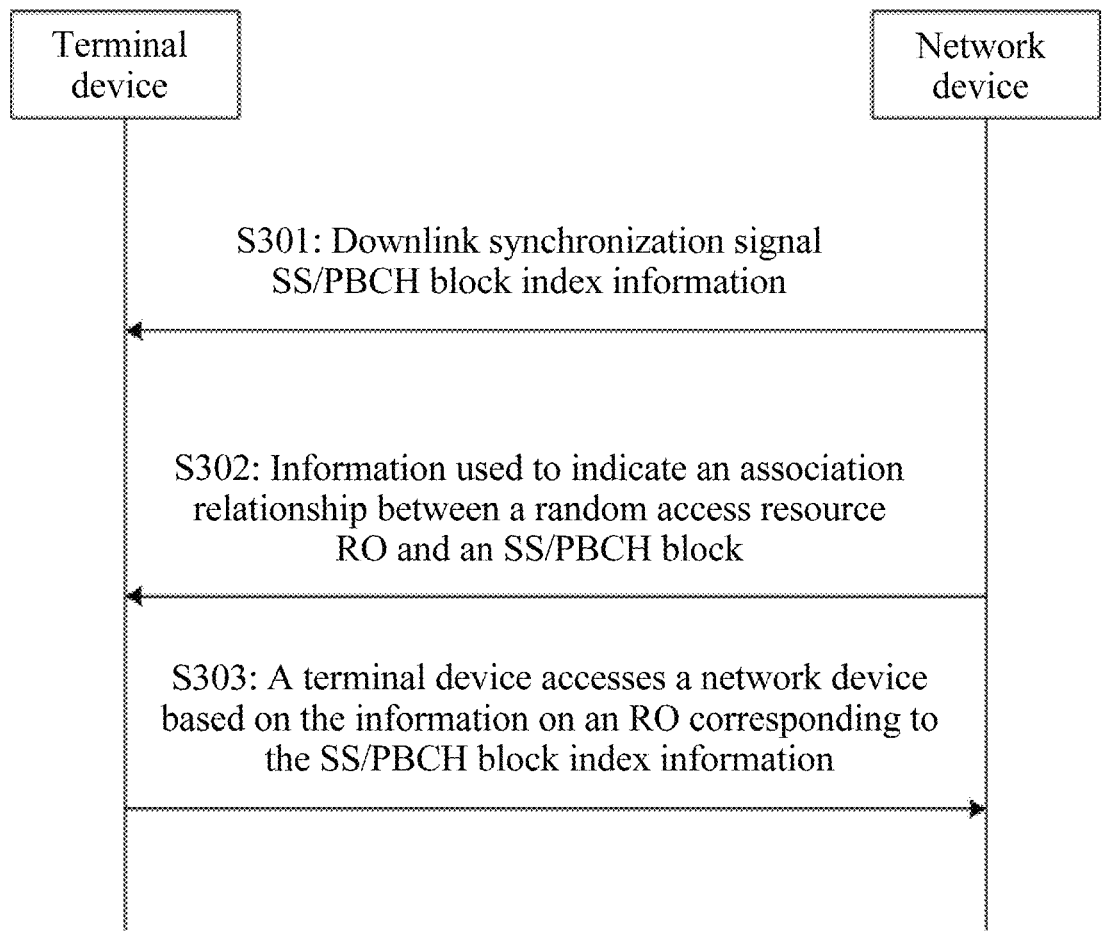
FIG. 3 is a schematic diagram of an interaction process of a communications method according to an embodiment of this application.

FIG. 3 is a schematic diagram of an interaction process of a communications method according to an embodiment of this application. The method may include the following steps:

S301: A network device sends synchronization signal block index information to a terminal device. The terminal device obtains the synchronization signal block index information. For example, the network device sends a synchronization signal block to the terminal device, where the synchronization signal block index information is implicitly carried in the synchronization signal block.

S302: The network device sends, to the terminal device, information used to indicate an association relationship between a random access resource RO and a synchronization signal block. The terminal device receives the indication information.

S303: The terminal device accesses the network device based on the information on an RO corresponding to the synchronization signal block index information. The network device receives a random access signal sent by the terminal device.

The network device sends a downlink signal (for example, the synchronization signal block) to the terminal device to perform downlink synchronization. The synchronization signal block index information is carried when the downlink signal is sent. The synchronization signal block index information is used to identify the synchronization signal block, and for example, is a serial number of the synchronization signal block, an index of the synchronization signal block, or other information available for identifying the synchronization signal block. One synchronization signal block includes one primary synchronization signal (PSS) symbol, one secondary synchronization signal (SSS) symbol, and two physical broadcast channel (PBCH) symbols.

In addition, the network device further sends, to the terminal device, the information used to indicate an association relationship between a random access resource RO and a synchronization signal block.

It should be noted that, the synchronization signal block index information and the information indicating an association relationship may be sent by the network device at the same time in one piece of configuration information, or may be separately sent by the network device. The two steps described herein do not necessarily mean that they are sent separately.

The association relationship between an RO and a synchronization signal block is at least one of the following:

a quantity of synchronization signal blocks associated with one RO is at least 1/F, or is P at most, where F is a quantity of ROs in frequency domain, and P is related to a quantity of actually transmitted downlink synchronization signal blocks; and/or N synchronization signal blocks or N synchronization signal block groups are associated with one RO in frequency domain or are associated with all ROs in frequency domain; and/or the first RACH resources in every X RACH resource configuration periods Y are associated with same synchronization signal blocks or synchronization signal block groups when one random access resource configuration period is P, where P and X are integers and Y is equal to P multiplied by X.

The association relationship between an RO and a synchronization signal block is described in detail below.

The terminal device accesses the network device based on the association relationship between an RO and a synchronization signal block on the RO corresponding to the synchronization signal block index information. For example, the terminal device sends a random access signal to the network device, and the network device receives the random access signal sent by the terminal device.

The network device knows a status of a random access receive beam corresponding to a downlink signal/transmit beam coverage area, and assigns a random access resource time-frequency location for each downlink signal, so that the terminal device obtains, through downlink synchronization, a time-frequency location for sending an uplink random access signal, to avoid a blind attempt of the terminal device and a beam mismatch of the network device occurring when the network device receives a random access signal, thereby improving efficiency.

Specifically, the association relationship between an RO and a synchronization signal block is described below:

One association relationship is that a quantity of synchronization signal blocks associated with one RO is at least 1/F, or is P at most, where F is a quantity of ROs in frequency domain, and P is related to a quantity of actually transmitted synchronization signal blocks.

In this association relationship, the quantity of ROs in frequency domain and a quantity of synchronization signal blocks or synchronization signal block groups associated with one RO are jointly configured.

In specific implementation, the quantity N of synchronization signal blocks associated with one RO may be related to F. For example, the quantity N may be a multiple of 1/F; or the quantity N may be 1/F, in other words, one synchronization signal block may be associated with all of F ROs; or the quantity N may be a fractional multiple of F. F is the quantity of ROs in frequency domain, and a value of F may be 1, 2, 4, 6, or 8. The network device may define or configure a minimum quantity of synchronization signal blocks associated with one RO as 1/F. A value of N may also be defined based on F. For example, when F=1, the value of N may be 1, 2, 3, 4, ..., Y1, where Y1 is a maximum quantity of SS/PBCH blocks associated with one RO; when F=2, the value of N may be ½, 1, 2, 3, 4, ..., Y1; when F=4, the value of N may be ¼, ½, 1, 2, 3, 4, ..., Y1; when F=6, the value of N may be ⅙, ⅓, ½, 1, 2, 3, 4, ..., Y1; when=8, the value of N may be ⅛, ¼, ½, 1, 2, 3, 4, ..., Y1.

The value of N may also be related to a quantity of synchronization signal blocks actually transmitted in a half-frame, for example, a factor of the quantity of actually transmitted synchronization signal blocks.

Another association relationship is that N synchronization signal blocks or N synchronization signal block groups are associated with one RO in frequency domain or are associated with all ROs in frequency domain.

In specific implementation, the N synchronization signal blocks or synchronization signal block groups may be associated with all of F ROs. F may be a value greater than or equal to 1. A value of N may be some or all values of 1 to 8. When the value of N is some of the values, the value of N may be 1, may be 1 or 2, may be 1, 2, or 3, or may be 1, 2, 3, or 4. The N synchronization signal blocks or synchronization signal block groups may be associated with one frequency division multiplexed RO, or may be associated with some frequency division multiplexed ROs. The network device may instruct to associate the N synchronization signal blocks or downlink synchronization signal block groups with all of the F ROs or with one RO in frequency domain. The F ROs may be frequency division multiplexed ROs of a same time.

When a quantity N2 of actually transmitted synchronization signal blocks or synchronization signal block groups is less than a quantity N, configured by the network device, of synchronization signal blocks or synchronization signal block groups associated with one RO, all of the N synchronization signal blocks or downlink synchronization signal block groups may be associated with one corresponding RO. For example, if the quantity of actually transmitted synchronization signal blocks is 5 and the quantity, configured by the network device, of synchronization signal blocks associated with one RO is 8, all of the 5 synchronization signal blocks are associated with the RO.

Figure 4A:
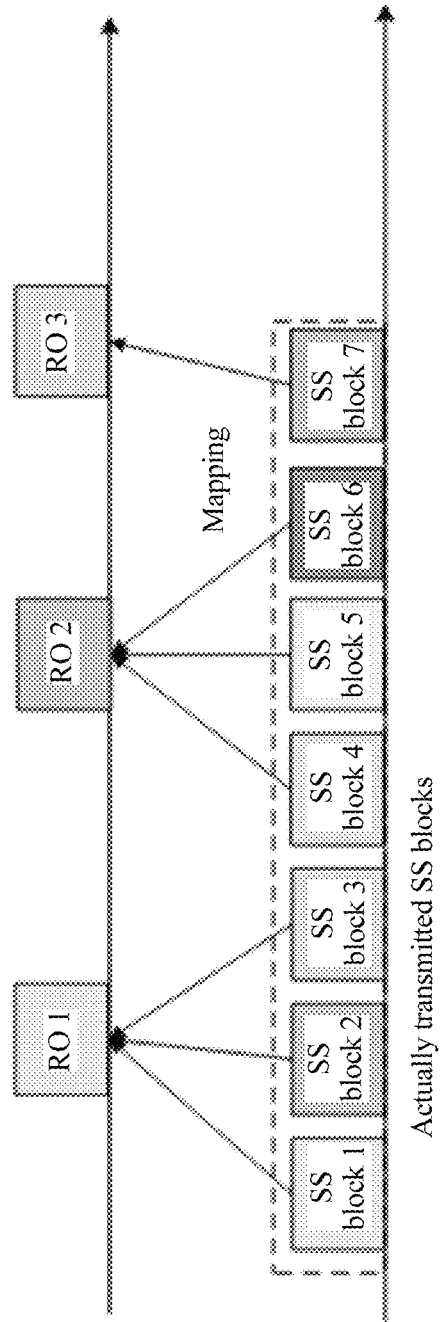
FIG. 4a to FIG. 4e are schematic diagrams of association between a random access occasion and a synchronization signal block or a synchronization signal block group in an example of this application.
Figure 4B:
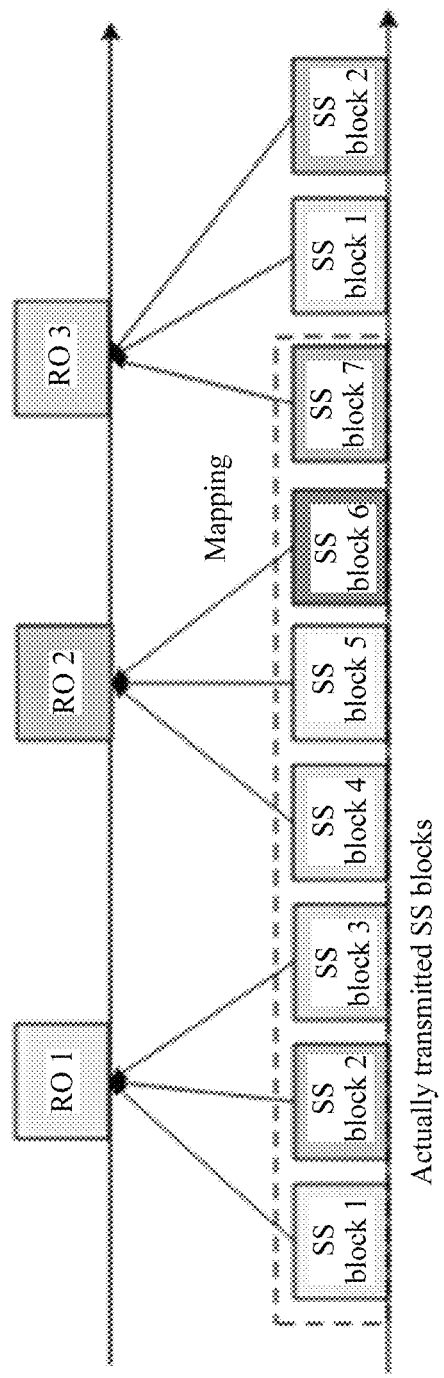

When a quantity N of actually transmitted synchronization signal blocks or synchronization signal block groups cannot be exactly divided by a quantity M, configured by the network device, of synchronization signal blocks or synchronization signal block groups associated with one RO, after a quantity of synchronization signal blocks or synchronization signal block groups are associated with a corresponding to RO, where the quantity is an integer multiple of the quantity M configured by the network device, a remaining synchronization signal block or synchronization signal block group is associated with another one or more ROs. For example, it is assumed that K1=floor(N/M) and first K1×M of N synchronization signal blocks are associated with K1 corresponding ROs; in this case, N−K1×M final remaining synchronization signal blocks or synchronization signal block groups are associated with another one or more ROs, as shown in FIG. 4a. Alternatively, last K1×M of N synchronization signal blocks are associated with K1 corresponding ROs; in this case, N−K1×M remaining synchronization signal blocks or synchronization signal block groups are associated with another one or more ROs. Alternatively, a remaining synchronization signal block may be not associated, or synchronization signal blocks or synchronization signal block groups may be cyclically associated with ROs, as shown in FIG. 4b. When F ROs are associated with one synchronization signal block, the F ROs may be F ROs in one RO configuration period or F ROs in one RO association period. Alternatively, an averaging method may be used. For example, a quantity, configured by the network device, of synchronization signal blocks or synchronization signal block groups associated with one RO is N2, a quantity of actually transmitted synchronization signal blocks or synchronization signal block groups is M2, and a quantity of ROs that can be associated is K1; in this case, a quantity M3 of actually transmitted synchronization signal blocks or synchronization signal block groups that are associated with one RO may be M2/K1, where a value of M3 may be an average value less than N2. For example, a maximum quantity of synchronization signal blocks or synchronization signal block groups associated with one RO is 8, a quantity of actually transmitted downlink synchronization signal blocks or synchronization signal block groups is 12, and 2 or 3 ROs may be associated. When 2 ROs are associated, a quantity of synchronization signal blocks or synchronization signal block groups associated with each RO is 6.

Further, when the association relationship is that N synchronization signal blocks or N synchronization signal block groups are associated with one RO in frequency domain or are associated with all ROs in frequency domain, the method further includes:

receiving, by the terminal device, indication information from the network device, where the indication information is used to indicate that the N synchronization signal blocks or the N synchronization signal block groups are associated with one RO in frequency domain, or is used to indicate that the N synchronization signal blocks or the N synchronization signal block groups are associated with all the ROs in frequency domain.

Still another association relationship is that the first RACH resources in every X RACH resource configuration periods Y are associated with same synchronization signal blocks or synchronization signal block groups when one random access resource configuration period is P, where P and X are integers and Y is equal to P multiplied by X.

This method for associating a RACH resource with a synchronization signal block or synchronization signal block group is a cyclic association method. A parameter X is set, and the first RACH resources in X RACH resource configuration periods are associated with same synchronization signal blocks. In other words, an association relationship in every X RACH resource configuration period is re-calculated. The X RACH resource configuration period may be referred to as one random access period. X may be fixed in a protocol, for example, may be any value in 1, 2, 3, 4, 5, 6, 7, 8, 9, 10, 11, 12, 13, 14, 15, and 16, for example, may be 1, 8, or 16. X may be received from the network device or may be prestored. A quantity of random access resources in one random access resource configuration period or one random access resource association period is related to a quantity of downlink synchronization signal blocks or downlink synchronization signal block groups. A value of X may be configured, and may be some or all values in 1, 2, 3, 4, 5, 6, 7, 8, 9, 10, 11, 12, 13, 14, 15, and 16.

The random access resource association period may be understood as an amount of time or a time width occupied by a random access resource associated with a synchronization signal block, or a quantity of ROs associated with a sent downlink synchronization signal block. The first RO is associated with the first sent synchronization signal block in each of different association periods. Alternatively, the first random access resource is associated with the first sent synchronization signal block in each of different time periods for association.

The random access resource configuration period is also referred to as a random access configuration period, and is a time interval at which a random access resource repeatedly occurs, or includes at least a time interval at which random access resources in one complete random access resource association period repeatedly occur.

The X RACH resource configuration periods may also be fixed to Y ms. A value of Y may be 10, 20, 40, 80, 160, 320, or 640. It should be noted that, the network device may pre-configure a plurality of values of Y. In an actual application, the network device may select one of the values of Y, or may dynamically configure one value of Y at a time. The value of X is determined based on the RACH resource configuration period. For example, Y=160, and the RACH resource configuration period is 40 ms; in this case, X=4. Y may be received from the network device or may be prestored.

Alternatively, the value of X or Y may be determined based on the quantity of actually transmitted synchronization signal blocks or synchronization signal block groups and/or the quantity of synchronization signal blocks or synchronization signal block groups associated with one RO, and/or determined based on a quantity of random access resources in a RACH resource configuration period. For example, a quantity of ROs in one RO period is 2, the quantity of synchronization signal blocks or downlink synchronization signal block groups associated with one RO is 3, and the quantity of actually transmitted synchronization signal blocks or synchronization signal block groups is 8; in this case, a required value of X is 4. In addition, X may also be a fixed value, for example, the value of X is 1, 2, 4, 8, or 16. In this way, a quantity of remaining ROs in the system can be reduced. The value of X may be an integer multiple or a fractional multiple of the quantity of actually transmitted synchronization signal blocks.

A quantity of RACH resources in the RACH resource configuration period may be related to a quantity of synchronization signal blocks or synchronization signal block groups actually transmitted in a half-frame. For example, if X is 1, an association period is 1. In this case, the quantity of RACH resources in the RACH resource configuration period may be the same as or may be an integer multiple or a fractional multiple of the quantity of actually transmitted downlink synchronization signal blocks or synchronization signal block groups. When one RO is associated with a plurality of synchronization signal blocks or synchronization signal block groups, the quantity of RACH resources in the RACH resource configuration period may be a fractional multiple of the quantity of actually transmitted downlink synchronization signal blocks or synchronization signal block groups. When a plurality of ROs are associated with one downlink synchronization signal block or synchronization signal block group, the quantity of RACH resources in the RACH resource configuration period may be an integer multiple of the quantity of actually transmitted downlink synchronization signal blocks or synchronization signal block groups. When association is performed one to one, the quantity of RACH resources in the RACH resource configuration period may be the same as the quantity of actually transmitted downlink synchronization signal blocks or synchronization signal block groups.

X or Y may alternatively be configured. For example, X may be some or all values selected from 1, 2, 3, 4, 5, 6, 7, 8, 9, 10, 11, 12, 13, 14, 15, and 16, for example, may be a value in 1, 2, 4, 8, and 16. The value of Y may also be some or all values selected from 1, 2, 3, 4, 5, 6, 7, 8, 9, 10, 11, 12, 13, 14, 15, and 16, for example, may be a value in 4, 8, and 16. The value of X or Y may be configured in system information (such as SIB1 or SIB2 or RMSI), or may be configured in a MAC-CE, DCI, a MIB, or RRC.

It is assumed that N is the quantity of synchronization signal blocks or synchronization signal block groups associated with one RO, and Q is the quantity of actually transmitted or possibly transmitted synchronization signal blocks or synchronization signal block groups. In this case, an index j of a synchronization signal block or synchronization signal block group associated with an $i^{th}$ RO is (i×N) mod Q to (i×N) mod Q+N−1. If j is greater than or equal to Q, j=j mod Q. For example, N is 3 and Q is 8; in this case, indexes of synchronization signal blocks or synchronization signal block groups associated with an RO with j=5 are 7, 8, and 9, and mod 8 may be 0 and mode 9 may be 1. When N=1, j=i mod Q, as shown in 4c.

Figure 4C:
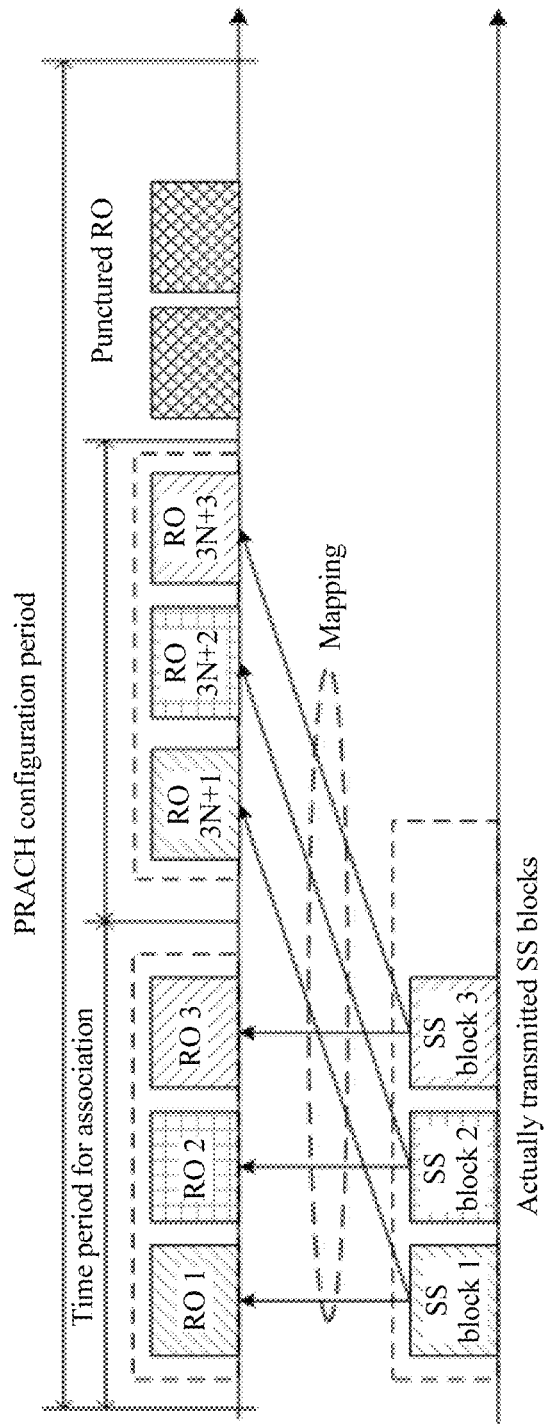

If quantities of ROs associated with some synchronization signal blocks or synchronization signal block groups are inconsistent because there is a remaining RO resource in a random access period, last two ROs shown in FIG. 4c are remaining ROs or redundant ROs.

In an implementation, a remaining RACH resource is considered as an invalid RACH resource and may be not associated with any synchronization signal block or synchronization signal block group. In other words, the terminal device may not send any random access preamble on the random access resource. A remaining RO is explained as follows: For example, one random access resource configuration period has 4 ROs, 3 periods are jointly configured, and there are 12 ROs in total. One RO is associated with one synchronization signal block and 5 synchronization signal blocks are associated. In this case, two remaining ROs exist, and each RO is associated with one synchronization signal block. The 12 ROs are sorted, and indexes of the ROs are 0 to 11. ROs with indexes 0 and 5 are associated with an SSB with an index 0. ROs with indexes 1 and 6 are associated with an SSB with an index 1. ROs with indexes 3 and 8 are associated with an SSB with an index 3. ROs with indexes 4 and 9 are associated with an SSB with an index 4. ROs with indexes 10 and 11 are remaining or redundant ROs.

Figure 4D:
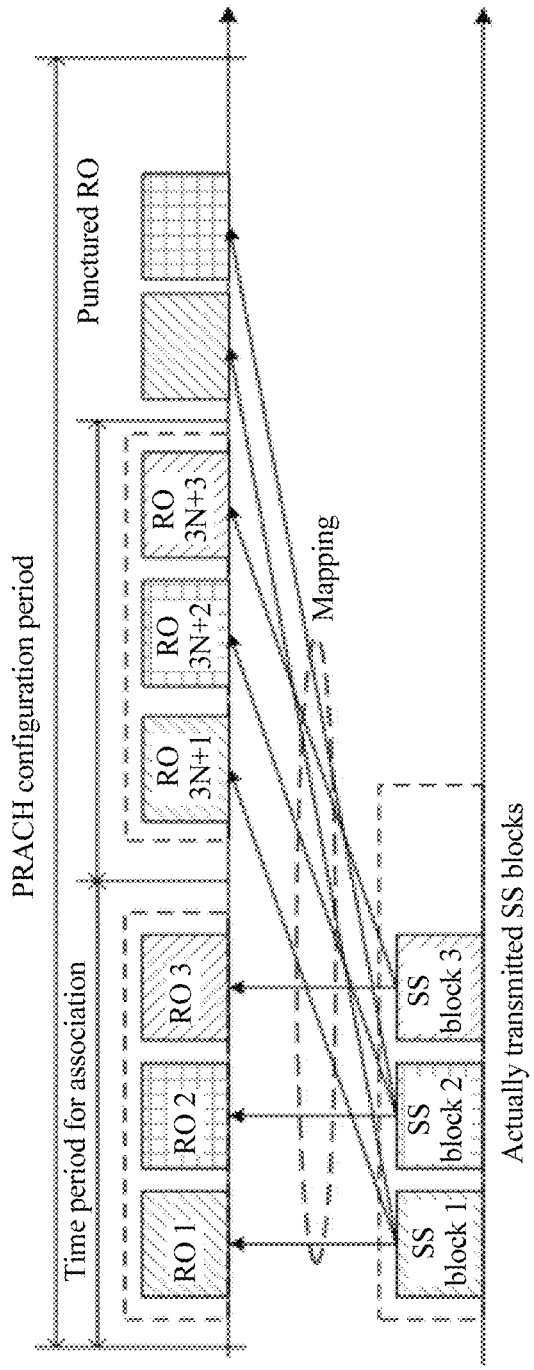

In another implementation, a remaining RO or a redundant RO has a different association relationship in every X RACH resource configuration periods or random access periods. The association relationship may be that one or more remaining random access resources are associated starting from the first synchronization signal block or synchronization signal block group, as shown in FIG. 4d.

Figure 4E:
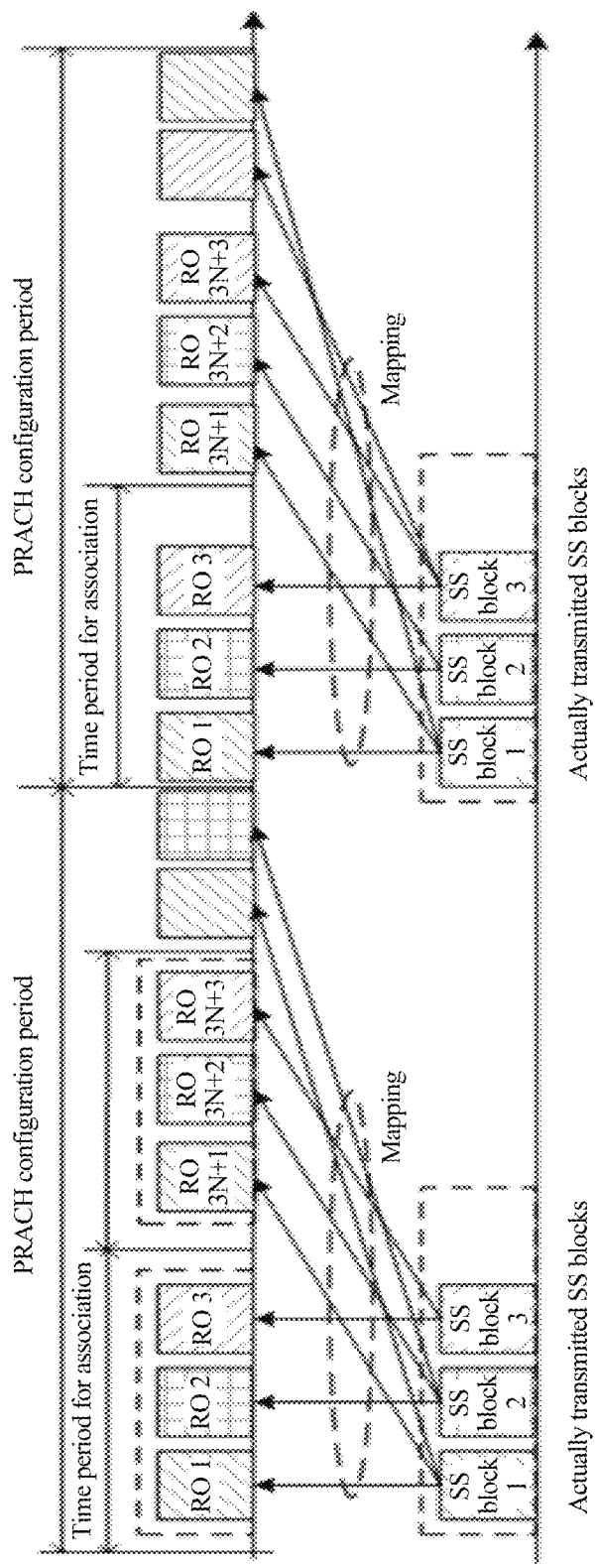

Alternatively, one or more remaining random access resources are associated starting from the last synchronization signal block or synchronization signal block group, or are associated with a next synchronization signal block of an end synchronization signal block in previous X periods, or are associated with a next synchronization signal block group of an end synchronization signal block group in previous X periods, as shown in FIG. 4e. For example, there are L remaining ROs in each random access period, the quantity of actually transmitted synchronization signal blocks or synchronization signal block groups is Q, and M is the quantity of synchronization signal blocks or synchronization signal block groups associated with one RO; in this case, an index j of a synchronization signal block or synchronization signal block group associated with an $i^{th}$ remaining RO in a random access period with an index m is $((m \times L+i) \times M)$ mod Q to $((m \times L+i) \times M)$ mod $Q+M-1$. Repeated association may be sequentially performed in different random access periods based on the foregoing relationship, for example, starting from the first synchronization signal block or synchronization signal block group in an odd-number period, starting from the last synchronization signal block or synchronization signal block group in an even-number period or an odd-number period, or starting from the first synchronization signal block or synchronization signal block group in an even-number period. Any one or more of the foregoing three association relationships may be used in different X periods.

Alternatively, the following may be implicitly or explicitly configured, including configured by the network device: "a quantity of ROs in frequency domain" and/or "a quantity of synchronization signal blocks associated with one RO" and/or "N synchronization signal blocks or N synchronization signal block groups are associated with only one RO in frequency domain or are associated with all ROs in frequency domain". The sequence includes: ROs in one RACH resource configuration period are associated with different synchronization signal blocks or synchronization signal block groups or a same synchronization signal block or synchronization signal block group according to a sequence of "frequency domain first and time domain later" or "time domain first and frequency domain later".

The synchronization signal block or synchronization signal block group mentioned in this application may be a synchronization signal block or synchronization signal block group in a half-frame, and this is universal for all transport synchronization signal blocks. Alternatively, the synchronization signal block or synchronization signal block group mentioned in this application may be a synchronization signal block or synchronization signal block group in one SS/PBCH burst set.

In addition, the network device configures a quantity of synchronization signal blocks or synchronization signal block groups associated with one RO as N, a quantity of actually transmitted synchronization signal blocks as Q1, a quantity of actually transmitted synchronization signal blocks in one actually transmitted synchronization signal block group as Q2, and a quantity of actually transmitted synchronization signal block groups as Q3, where Q1, Q2, and Q3 may be multiples of N. The terminal device may determine a value of N based on a factor of any one or more values of Q1, Q2, and Q3. For example, if Q1=6, a value range of N can only be 1, 2, 3, and 6. P is a factor of Q1, in other words, Q1 is a multiple of N. The network device may set the value of N to some values of factors of any one or more values of Q1, Q2, and Q3, for example, first H values, where H may be any value of 1, 2, 3, 4, 5, 6, 7, and 8. The first H values may be first H smallest values in ascending order, or may be first H largest values in descending order. For example, if Q1=24 and H=4, only four factors 1, 2, 3, and 4 are selected. For example, the network device configures the quantity of synchronization signal blocks or synchronization signal block groups associated with one RO as N, and the value of N may be 3 or 4. When the quantity of actually transmitted synchronization signal blocks or synchronization signal block groups is 6, N is 3; when the quantity of actually transmitted synchronization signal blocks or synchronization signal block groups is 8, N is 4.

When the quantity of synchronization signal blocks associated with one RO is N, and a quantity of contention-based or non-contention-based or all random access preambles in one RO is N1, a quantity N2 of random access preambles associated with one SSB is no more than floor(N1/N) or N1/N. A value of N1 may be any one or more values of 4, 8, 12, 16, 20, 24, 28, 32, 36, 40, 44, 48, 52, 56, 60, 64, 128, and 256. The terminal device does not desire that a quantity of random access preambles that is configured by the network device is greater than floor(N1/N) or N1/N. Alternatively, when a quantity of random access preambles that is configured by the network device and that is received by the terminal device is greater than floor(N1/N) or N1/N, a preamble is selected from no more than floor(N1/N) or N1/N preambles. A benefit is that different random access preambles may be associated with different synchronization signal blocks, and the random access preambles associated with the different synchronization signal blocks do not overlap each other. In this way, the network device can differentiate between terminal devices with spatial domain parameters (beams) corresponding to different SS/PBCH blocks. The value of N may be some or all values of 1, 2, 3, 4, 5, 6, 7, 8, 9, 10, 11, 12, 14, 15, 16, and 18. The network device may configure a quantity of random access preambles associated with one SSB at a granularity of 4 or 2 or 1. The granularity may be determined based on the quantity of synchronization signal blocks associated with one RO. For example, when the quantity of synchronization signal blocks associated with one RO is 1, the granularity is 4, or when the quantity of synchronization signal blocks associated with one RO is greater than 1, the granularity is 2 or 1.

The association relationship between an RO and a quantity of synchronization signal blocks is determined above. After the association relationship between an RO and a quantity of synchronization signal blocks or synchronization signal block groups is determined, indexes of the RO and the synchronization signal block need to be associated. A specific association manner is as follows:

The association relationship between an RO and a synchronization signal block may be configured in a one-to-many, many-to-one, one-to-one, or many-to-many manner. When the association relationship between a random access timing and a synchronization signal block is configured in the many-to-one manner, to be specific, when N random access preambles/timings are associated with one synchronization signal block, the N random access timings may be frequency division multiplexed, to be specific, arranged at a same time but different frequencies; or may meet time division multiplexed, to be specific, located on different time resources; or may be both time division multiplexed (TDM) and frequency division multiplexed (FDM). A value of N may be 1, 2, 4, and 6, or may be 1, 2, 4, and 8, or may be at least one or four of 1, 2, 3, 4, 5, 6, 7, 8, 9, 10, 11, 12, 13, 14, 15, and 16. The quantity of synchronization signal blocks associated with one random access timing may be 1, 2, or 4. Alternatively, one or two synchronization signal block groups may be associated with one random access timing. Alternatively, all frequency division multiplexed ROs may be associated with one synchronization signal block.

A quantity M of synchronization signal blocks associated with N (N>1) ROs may be at least one of 1, 2, 3, 4, 5, 6, 7, and 8, for example, may be 1, 2, or 4. Alternatively, a quantity M of synchronization signal block groups associated with N (N>1) ROs may be at least one of 1, 2, 3, 4, 5, 6, 7, and 8, for example, may be 1 or 2.

When an association relationship of associating N ROs with M synchronization signal blocks may be configured in the one-to-one manner, for example, an $n^{th}$ RO may be configured to associate with an $m^{th}$ synchronization signal block, m may be equal to n, a value of m may be 0 to M−1, and a value of n may be 0 to N−1. Alternatively, one-to-many, many-to-many, or one-to-one configuration may be performed. There may be five methods for one-to-many configuration.

In a first configuration method for associating M synchronization signal blocks with N ROs, the M synchronization signal blocks are associated with each of the N ROs. For example, if M=2 and N=2, a synchronization signal block with an index in {m, m+1} is associated with an RO with an index n, and a downlink synchronization signal block with an index in {m, m+1} is associated with an RO with an index n+1, where m and n are respectively multiples of M and N, and m may be equal to n. For example, if M=2 and N=2, a synchronization signal block with an index in {m, . . . , m+M−1} is associated with each RO with an index in {n, . . . , n+N−1}, where m and n are respectively multiples of M and N, and m may be equal to n. For example, a synchronization signal block with an index i may be associated with an RO with an index j, where floor(i/M)=floor(j/N), i may be equal to m, and j may be equal to n.

In a second configuration method, M synchronization signal blocks are associated with corresponding ROs in N ROs, and each RO is associated with a different synchronization signal block. For example, a synchronization signal block with an index i is associated with an RO with an index j, where n=j mod N; m=i mod M; m=n×M, or (i mod M)=(j mod N)×M; M may be in a relationship with N, for example, a multiple relationship, and M may be a multiple of N obtained by multiplying N by 1, 2, 3, 4, 5, 6, 7, 8, 9, or 10. For example, a synchronization signal block with an index in {m, . . . , m+M−1} is associated with an RO with an index n, where m=n×M, or i=j×M.

In a third configuration method for associating M synchronization signal blocks with N ROs, an RO with an index in {n, . . . , n+N−1} is associated with each of the M synchronization signal blocks, as shown in FIG. 4b. For example, an RO with an index in {n, . . . , n+N−1} is associated with a synchronization signal block with an index i, where i is any value in {m, . . . , m+M−1}. For example, a synchronization signal block with an index i is associated with an RO with an index j, where floor(i/M)=floor(j/N). For example, if M=2 and N=2, an RO with an index in {n, n+1} is associated with a synchronization signal block with an index m, and an RO with an index in {n, n+1} is associated with a synchronization signal block with an index m, where m and n are respectively multiples of M and N, and m may be equal to n. For example, a synchronization signal block with an index i is associated with an RO with an index j, where floor(i/M)=floor(j/N).

In a fourth configuration method, N ROs are associated with corresponding synchronization signal blocks, and each synchronization signal block is associated with a different RO. An RO with an index in {n, n+1}, {n, n+1, n+2}, {n, n+1, n+2, n+3}, or {n, n+1, n+2, n+3, n+4, n+5} is associated with a synchronization signal block with an index m, where in this case, m is an even number, n=m×2, n=m×4, n=m×3, or n=m×6. For example, an RO with an index in {n, . . . , n+N−1} is associated with a synchronization signal block with an index m, where n=m×N. For example, a synchronization signal block with an index i is associated with an RO with an index j, where j=i×N.

In a fifth configuration method, M synchronization signal blocks are associated with N ROs through repeated association or puncturing ("punctured" has a same meaning as "released", "deleted", "unused", "not transmitted", "not associated", and "not corresponding", or the terminal device does not send a random access preamble on the punctured RO): An index relationship of an index n of an RO associated with a synchronization signal block with an index m is: m mod M=(n mod N) mod M.

Values of M and N each may be any value of 1, 2, 3, 4, 5, 6, 7, 8, 10, 12, 14, and 16. The value of N may be set based on a quantity of frequency division multiplexed ROs. For example, the value of N is a factor of the quantity of frequency division multiplexed ROs or is the quantity of frequency division multiplexed ROs. The value of M may be a factor of a quantity of actually transmitted synchronization signal blocks, or may be a configured value. The value of M is related to the value of N. The two values may be in a multiple relationship, or one value may be less than the other value.

There are five configuration methods for associating a plurality of ROs with one or more synchronization signal block groups. In a first configuration method for associating M synchronization signal block groups with N ROs, the M synchronization signal block groups are associated with each of the N ROs. For example, if M=2 and N=2, a synchronization signal block group with an index in {m, m+1} is associated with an RO with an index n, and a synchronization signal block group with an index in {m, m+1} is associated with an RO with an index n+1, where m and n are respectively multiples of M and N, and m may be equal to n. For example, if M=2 and N=2, a synchronization signal block group with an index in {m, . . . , m+M−1} is associated with each RO with an index in {n, . . . , n+N−1}, where m and n are respectively multiples of M and N, and m may be equal to n. For example, a synchronization signal block group with an index i is associated with an RO with an index j, where floor(i/M)=floor(j/N).

In a second configuration method, M synchronization signal block groups are associated with corresponding ROs in N ROs, and each RO is associated with a different synchronization signal block group. For example, a synchronization signal block group with an index i is associated with an RO with an index j, where n=j mod N; m=i mod M; m=n×M, or (i mod M)=(j mod N)×M; M may be in a relationship with N, for example, a multiple relationship, and M may be a multiple of N obtained by multiplying N by 1, 2, 3, 4, 5, 6, 7, 8, 9, or 10. For example, a synchronization signal block group with an index in {m, . . . , m+M−1} is associated with an RO with an index n, where m=n×M, or i=j×M.

In a third configuration method for associating M synchronization signal block groups with N ROs, an RO with an index in {n, . . . , n+N−1} is associated with each of the M synchronization signal block groups, as shown in FIG. 1. For example, an RO with an index in {n, . . . , n+N−1} is associated with a synchronization signal block group with an index i, where i is any value in {m, . . . , m+M−1}. For example, a synchronization signal block group with an index i is associated with an RO with an index j, where floor(i/M)=floor(j/N). For example, if M=2 and N=2, an RO with an index in {n, n+1} is associated with a synchronization signal block group with an index m, and an RO with an index in {n, n+1} is associated with a synchronization signal block group with an index m, where m and n are respectively multiples of M and N, and m may be equal to n. For example, a synchronization signal block group with an index i is associated with an RO with an index j, where floor(i/M)=floor(j/N).

In a fourth configuration method, N ROs are associated with corresponding synchronization signal block groups, and each synchronization signal block group is associated with a different RO. An RO with an index in {n, n+1}, {n, n+1, n+2}, {n, n+1, n+2, n+3}, or {n, n+1, n+2, n+3, n+4, n+5} is associated with a synchronization signal block group with an index m, where in this case, m is an even number, n=m×2, n=m×4, n=m×3, or n=m×6. For example, an RO with an index in {n, . . . , n+N−1} is associated with an RO with an index m, where n=m×N. For example, a synchronization signal block group with an index i is associated with an RO with an index j, where j=i×N.

In a fifth configuration method, M synchronization signal block groups are associated with N ROs through repeated association or puncturing ("punctured" has a same meaning as "released", "deleted", "unused", "not transmitted", "not associated", and "not corresponding"): An index relationship of an index n of an RO associated with a synchronization signal block group with an index m is: m mod M=(n mod N) mod M.

Values of M and N each may be any value of 1, 2, 3, 4, 5, 6, 7, 8, 10, 12, 14, and 16. The network device may configure these parameters based on any combination of the foregoing methods or by using an indexing method. Table 1 is a table of one configuration. Table 2 is a table of another configuration. The value of M may be some or all values of 1, 2, 4, 6, and 8, for example, may be 1, 2, 4, and 6, or 1, 2, 4, and 8. The value of N may be 1, 2, and 4. The value of N may be set based on a quantity of frequency division multiplexed ROs. For example, the value of N is a factor of the quantity of frequency division multiplexed ROs or is the quantity of frequency division multiplexed ROs. The value of M may be a factor of a quantity of actually transmitted synchronization signal blocks, or may be a configured value. The value of M is related to the value of N.

It should be noted that, an index n of an RO may be an index of an RO in one association period (time period for association), or may be an index of an RO in X RACH resource configuration periods, or may be an index of an RO in one RACH resource configuration period, and may be collectively referred to as an index of an RO in a period. The index n has a plurality of forms. A first form is a direct index n, and a value of n may be 0, 1, 2, 3, and 4. The index n is related to an RO count in a period, and is unrelated to another parameter. If there are 8 ROs in a period, the value of the index n is 0 to 7. In a second value setting method, the value of n is related to an RO location, and may be calculated by using the RO location, including a frequency location and a time-domain location. For example, one indexing method is n=f(s_id, t_id, f_id, _ul_carrier_id), and another index calculation method is n=f(s_id, t_id, f_id, _ ul_carrier_id) mod B, where B is a quantity of ROs in a period. f(s_id, t_id, f_id, _ul_carrier_id) indicates that n is related to at least one parameter in s_id, t_id, f_id, and _ ul_carrier_id. For example, a calculation method is f(s_id, t_id, f_id, _ul_carrier_id)=1+s_id+14×t_id+14×X×f_id+14×X×Y×ul_carrier_id, where s_id is a PRACH start symbol; t_id is a PRACH timeslot symbol; f_id is a PRACH frequency-domain location, and a value of f_id is greater than or equal to 0 and less than or equal to Y; ul_carrier_id is an uplink carrier index of a PRACH message 1; X is a maximum quantity of time-domain RACH resources; and Y is a maximum value of a frequency-domain RACH resource. This index may also be an index of a frequency division multiplexed RO.

n may alternatively be related to a quantity of synchronization signal blocks or synchronization signal block groups in a half-frame, or related to a quantity of synchronization signal blocks or a synchronization signal block groups associated with one RO, or related to a quantity M3 of random access resources in one random access resource configuration period or one random access resource association period. For example, n=n2 mod M2, where n2 is an index of an RO in a period, and M2 may be the quantity of synchronization signal blocks in a half-frame. For example, n=n2×M1, where M1 indicates a quantity of synchronization signal blocks or synchronization signal block groups associated with one RO. In an association relationship, an index of a synchronization signal block associated with an $n2^{th}$ RO is (n2×M1) mod M2 to (n2×(M1+1)−1) mod M2. For example, n=n2+i×M3 or n=(n2+i×M3)×M1, where i indicates an index of a random access resource configuration period or a random access resource association period in a random access period. In an association relationship, an index of a synchronization signal block associated with the $n2^{th}$ RO is n mod M2 to (n+M1−1) mod M2. K indicates a quantity of synchronization signal blocks in one synchronization signal block group. When an RO is associated with a synchronization signal block group, an index of the synchronization signal block group may be used to represent an index m of an SS block, or m may be used to represent k, where k=floor(m/K). g indicates a synchronization signal block group. For example, 1g indicates one group and 2g indicates two groups.

The network device may configure these parameters based on any combination of the foregoing methods or by using an indexing method. Table 1 is a table of one configuration. Table 2 is a table of another configuration. The network device may select some or all configured values or some or all rules in the tables for configuration. Example in Table 1 and Table 2 provides examples of Rule and Quantity association. The network device may perform configuration based on Rule and Quantity association, or Example, or Rule or Quantity association, or Version, or Version and Example.

TABLE 1

Configuration table of an association relationship between a synchronization signal block or a synchronization signal block group and an RO

| Index | $n_{RO}$ | $n_{SSB}$ | Rule | Quantity association | Version | Example |
|---|---|---|---|---|---|---|
| 0 | 1 | 1 | m = n | 1 to 1 | 0 | Mapped to the only one FDMed RO, m = n |
| 1 | 1 | 2 | n = floor(m/2) | 1 to 2 | 0 | Mapped to the only one FDMed RO, n = floor(m/2) |

TABLE 1-continued

Configuration table of an association relationship between a synchronization signal block or a synchronization signal block group and an RO

| Index | $n_{RO}$ | $n_{SSB}$ | Rule | Quantity association | Version | Example |
|---|---|---|---|---|---|---|
| 2 | 1 | 4 | n = floor(m/4) | 1 to 4 | 0 | Mapped to the only one FDMed RO, n = floor(m/4) |
| 3 | 1 | 1 group | n = k | 1 to 1 g | 0 | Mapped to the only one FDMed RO, n = k |
| 4 | 1 | 2 groups | n = floor(k/2) | 1 to 2 g | 0 | Mapped to the only one FDMed RO, n = floor(k/2) |
| 5 | 2 | 1 | m = floor(n/2) | 2 to 1 | 0 | One SSB mapped to all the FDMed ROs, m = floor(n/2) |
| 6 | 2 | 1 | m = n | 1 to 1 | 1 | $SSB_0 \rightarrow RO_0$, $SSB_1 \rightarrow RO_1$, m = n |
| 7 | 2 | 2 | floor(m/2) = floor(n/2) | 2 to 2 | 0 | $\{SSB_0, SSB_1\} \rightarrow RO_0$, $\{SSB_0, SSB_1\} \rightarrow RO_1$, floor(m/2) = floor(n/2) |
| 8 | 2 | 2 | n = floor(m/2) | 1 to 2 | 1 | $\{SSB_0, SSB_1\} \rightarrow RO_0$, $\{SSB_2, SSB_3\} \rightarrow RO_1$ n = floor(m/2) |
| 9 | 2 | 4 | floor(m/4) = floor(n/2) | 2 to 4 | 0 | $\{SSB_0, \ldots, SSB_3\} \rightarrow RO_0$, $\{SSB_0, \ldots, SSB_3\} \rightarrow RO_1$, floor(m/4) = floor(n/2) |
| 10 | 2 | 1 group | k = floor(n/2) or floor(m/K) = floor(n/2) | 2 to 1 g | 0 | $\{SSBs\ in\ group\ 0\} \rightarrow RO_0$, $\{SSBs\ in\ group\ 0\} \rightarrow RO_1$, k = floor(n/2) or floor(m/K) = floor(n/2) |
| 11 | 2 | 1 group | k = n or floor(m/K) = n | 1 to 1 g | 1 | $\{SSBs\ in\ group\ 0\} \rightarrow RO_0$, $\{SSBs\ in\ group\ 1\} \rightarrow RO_1$, k = n or floor(m/K) = n |
| 12 | 2 | 2 groups | floor(k/2) = floor(n/2) or floor(m/(2 × K)) = floor(n/2) | 2 to 2 g | 0 | $\{SSBs\ in\ group\ 0, SSBs\ in\ group\ 1\} \rightarrow RO_0$, floor(k/2) = floor(n/2) $\{SSBs\ in\ group\ 0, SSBs\ in\ group\ 1\} \rightarrow RO_1$, floor(m/(2 × K)) = floor(n/2) |
| 13 | 2 | 2 groups | n = floor(k/2) or n = floor(m/(2 × K)) | 1 to 2 g | 1 | $\{SSBs\ in\ group\ 0, SSBs\ in\ group\ 1\} \rightarrow RO_0$, n = floor(k/2) or $\{SSBs\ in\ group\ 2, SSBs\ in\ group\ 3\} \rightarrow RO_1$, n = floor(m/(2 × K)) |
| 14 | 4 | 1 | m = floor(n/4) | 4 to 1 | 0 | One SSB mapped to all the FDMed ROs, m = floor(n/4) |
| 15 | 4 | 1 | m = n | 1 to 1 | 1 | $SSB_0 \rightarrow RO_0$, $SSB_1 \rightarrow RO_1$, $SSB_2 \rightarrow RO_2$, $SSB_3 \rightarrow RO_3$, m = n |
| 16 | 4 | 2 | floor(m/2) = floor(n/4) | 4 to 2 | 0 | $\{SSB_0, SSB_1\} \rightarrow RO_0$, $\{SSB_0, SSB_1\} \rightarrow RO_1$, $\{SSB_0, SSB_1\} \rightarrow RO_2$, $\{SSB_0, SSB_1\} \rightarrow RO_3$, floor(m/2) = floor(n/4) |
| 17 | 4 | 2 | floor(m/2) = n mod 4 or floor(m/2) = n | 1 to 2 | 1 | $\{SSB_0, SSB_1\} \rightarrow RO_0$, $\{SSB_2, SSB_3\} \rightarrow RO_1$, $\{SSB_4, SSB_5\} \rightarrow RO_2$, $\{SSB_6, SSB_7\} \rightarrow RO_3$, floor(m/2) = n mod 4 or floor(m/2) = n |
| 18 | 4 | 4 | floor(m/4) = floor(n/4) | 4 to 4 | 0 | $\{SSB_0, \ldots, SSB_3\} \rightarrow RO_0$, $\{SSB_0, \ldots, SSB_3\} \rightarrow RO_1$, floor(m/4) = floor(n/4) $\{SSB_0, \ldots, SSB_3\} \rightarrow RO_2$, $\{SSB_0, \ldots, SSB_3\} \rightarrow RO_3$ |
| 19 | 4 | 1 group | k = floor(n/4) | 4 to 1 g | 0 | $\{SSBs\ in\ group\ 0\} \rightarrow RO_0$, $\{SSBs\ in\ group\ 0\} \rightarrow RO_1$, k = floor(n/4) $\{SSBs\ in\ group\ 0\} \rightarrow RO_2$, $\{SSBs\ in\ group\ 0\} \rightarrow RO_3$ |
| 20 | 4 | 1 group | k = n | 1 to 1 g | 1 | $\{SSBs\ in\ group\ 0\} \rightarrow RO_0$, $\{SSBs\ in\ group\ 1\}$ |

TABLE 1-continued

Configuration table of an association relationship between a synchronization signal block or a synchronization signal block group and an RO

| Index | $n_{RO}$ | $n_{SSB}$ | Rule | Quantity association | Version | Example |
|---|---|---|---|---|---|---|
| 21 | 4 | 2 groups | floor(n/4) = floor(k/2) | 4 to 2 g | 0 | → $RO_1$, k = n {SSBs in group 2} → $RO_2$, {SSBs in group 3} → $RO_3$ {SSBs in group 0, SSBs in group 1} → $RO_0$, floor(n/4) = floor(k/2) {SSBs in group 0, SSBs in group 1} → $RO_1$ {SSBs in group 0, SSBs in group 1} → $RO_2$ {SSBs in group 0, SSBs in group 1} → $RO_3$ |
| 22 | 4 | 2 groups | n = floor(k/2) or n mod 4 = floor(k/2) | 1 to 2 g | 1 | {SSBs in group 0, SSBs in group 1} → $RO_0$, n = floor(k/2) or n mod 4 = floor(k/2) {SSBs in group 2, SSBs in group 3} → $RO_1$ {SSBs in group 4, SSBs in group 5} → $RO_3$ {SSBs in group 6, SSBs in group 7} → $RO_4$ |
| 23 | 6 | 1 | m = floor(n/6) | 6 to 1 | 0 | One SSB mapped to all the FDMed ROs, m = floor(n/6) |
| 24 | 6 | 1 | m = n | 1 to 1 | 1 | $SSB_0$ → $RO_0$, ..., $SSB_5$ → $RO_5$, m = n |
| 25 | 6 | 2 | floor(m/2) = floor(n/6) | 6 to 2 | 0 | {$SSB_0$, $SSB_1$} → $RO_0$, ..., {$SSB_0$, $SSB_1$} → $RO_5$, floor(m/2) = floor(n/6) |
| 26 | 6 | 2 | floor(m/2) = n mod 6 or floor(m/2) = n | 1 to 2 | 1 | {$SSB_0$, $SSB_1$} → $RO_0$, ..., {$SSB_{10}$, $SSB_{11}$} → $RO_1$, floor(m/2) = n mod 6 or floor(m/2) = n |
| 27 | 6 | 4 | floor(m/4) = floor(n/6) | 6 to 4 | 0 | {$SSB_0$, ..., $SSB_3$} → $RO_0$, ..., {$SSB_0$, ..., $SSB_3$} → $RO_5$, floor(m/4) = floor(n/6) |
| 28 | 6 | 1 group | k = floor(n/6) | 6 to 1 g | 0 | {SSBs in group 0} → $RO_0$, ..., {SSBs in group 0} → $RO_5$, k = floor(n/6) |
| 29 | 6 | 1 group | k = n | 6 to 1 g | 1 | {SSBs in group 0} → $RO_0$, ..., {SSBs in group 5} → $RO_5$, k = n |
| 30 | 6 | 2 groups | floor(n/6) = floor(k/2) | 6 to 2 g | 0 | {SSBs in group 0, SSBs in group 1} → $RO_0$, ..., floor(n/6) = floor(k/2) {SSBs in group 0, SSBs in group 1} → $RO_5$ |
| 31 | NA | NA | | NA | NA | NA |

TABLE 2

Configuration table of an association relationship between a synchronization signal block or a synchronization signal block group and an RO

| Index | $n_{RO}$ | $n_{SSB}$ | Rule | Quantity association | Version | Example |
|---|---|---|---|---|---|---|
| 0 | 1 | 1 | m = n | 1 to 1 | 0 | Mapped to the only one FDMed RO |
| 1 | 1 | 2 | n = floor(m/2) | 1 to 2 | 0 | Mapped to the only one FDMed RO |
| 2 | 1 | 4 | n = floor(m/4) | 1 to 4 | 0 | Mapped to the only one FDMed RO |
| 3 | 1 | All | | | 0 | Mapped to the only one FDMed RO |
| 4 | NA | NA | | | NA | NA |
| 5 | 2 | 1 | m = floor(n/2) | 2 to 1 | 0 | One SSB mapped to all the FDMed ROs |

TABLE 2-continued

Configuration table of an association relationship between a synchronization signal block or a synchronization signal block group and an RO

| Index | $n_{RO}$ | $n_{SSB}$ | Rule | Quantity association | Version | Example |
|---|---|---|---|---|---|---|
| 6 | 2 | 1 | m = n | 1 to 1 | 1 | $SSB_0 \to RO_0$, $SSB_1 \to RO_1$ |
| 7 | 2 | 2 | floor(m/2) = floor(n/2) | 2 to 2 | 0 | $\{SSB_0, SSB_1\} \to RO_0$, $\{SSB_0, SSB_1\} \to RO_1$ |
| 8 | 2 | 2 | n = floor(m/2) | 1 to 2 | 1 | $\{SSB_0, SSB_1\} \to RO_0$, $\{SSB_2, SSB_3\} \to RO_1$ |
| 9 | 2 | 4 | floor(m/4) = floor(n/2) | 2 to 4 | 0 | $\{SSB_0, \ldots, SSB_3\} \to RO_0$, $\{SSB_0, \ldots, SSB_3\} \to RO_1$ |
| 10 | 2 | 4 | k = floor(n/2) or floor(m/K) = floor(n/2) | 2 to 1 g | 1 | $\{SSB_0, \ldots, SSB_3\} \to RO_0$, $\{SSB_5, \ldots, SSB_7\} \to RO_1$, for >4 SSBs |
| 11 | 2 | All | k = n or floor(m/K) = n | 1 to 1 g | 0 | $\{SSB_0, \ldots, SSB_7\} \to RO_0$, $\{SSB_0, \ldots, SSB_7\} \to RO_1$, for >4 SSBs |
| 12 | 2 | All | floor(k/2) = floor(n/2) or floor(m/(2 × K)) = floor(n/2) | 2 to 2 g | 1 | $\{SSB_0, \ldots, SSB_3\} \to RO_0$, $\{SSB_5, \ldots, SSB_7\} \to RO_1$, for >4 SSBs |
| 13 | NA | NA | n = floor(k/2) or n = floor(m/(2 × K)) | 1 to 2 g | NA | NA |
| 14 | 4 | 1 | m = floor(n/4) | 4 to 1 | 0 | One SSB mapped to all the FDMed ROs |
| 15 | 4 | 1 | m = n | 1 to 1 | 1 | $SSB_0 \to RO_0$, $SSB_1 \to RO_1$, $SSB_2 \to RO_2$, $SSB_3 \to RO_3$ |
| 16 | 4 | 2 | floor(m/2) = floor(n/4) | 4 to 2 | 0 | $\{SSB_0, SSB_1\} \to RO_0$, $\{SSB_0, SSB_1\} \to RO_1$, $\{SSB_0, SSB_1\} \to RO_2$, $\{SSB_0, SSB_1\} \to RO_3$ |
| 17 | 4 | 2 | floor(m/2) = n mod 4 or floor(m/2) = n | 1 to 2 | 1 | $\{SSB_0, SSB_1\} \to RO_0$, $\{SSB_2, SSB_3\} \to RO_1$, $\{SSB_4, SSB_5\} \to RO_2$, $\{SSB_6, SSB_7\} \to RO_3$ |
| 18 | 4 | 4 | floor(m/4) = floor(n/4) | 4 to 4 | 0 | $\{SSB_0, \ldots, SSB_3\} \to RO_0$, $\{SSB_0, \ldots, SSB_3\} \to RO_1$, $\{SSB_0, \ldots, SSB_3\} \to RO_2$, $\{SSB_0, \ldots, SSB_3\} \to RO_3$ |
| 19 | 4 | 4 | k = floor(n/4) | 4 to 1 g | 1 | $\{SSB_0, \ldots, SSB_3\} \to RO_0$, $\{SSB_4, \ldots, SSB_7\} \to RO_1$, $\{SSB_0, \ldots, SSB_3\} \to RO_2$, $\{SSB_4, \ldots, SSB_7\} \to RO_3$, for >4 SSBs |
| 20 | 4 | All | k = n | 1 to 1 g | 0 | $\{SSB_0, \ldots, SSB_7\} \to RO_0, \ldots, \{SSB_0, \ldots, SSB_7\} \to RO_3$, for >4 SSBs |
| 21 | NA | NA | floor(n/4) = floor(k/2) | 4 to 2 g | NA | NA |
| 22 | NA | NA | n = floor(k/2) or n mod 4 = floor(k/2) | 1 to 2 g | NA | NA |
| 23 | 6 | 1 | m = floor(n/6) | 6 to 1 | 0 | One SSB mapped to all the FDMed ROs |
| 24 | 6 | 1 | m = n | 1 to 1 | 1 | $SSB_0 \to RO_0, \ldots, SSB_3 \to RO_3$, $SSB_0 \to RO_4$, $SSB_1 \to RO_5$, for ≤4 SSBs; $SSB_0 \to RO_0, \ldots, SSB_5 \to RO_5$, for >4 SSBs |
| 25 | 6 | 2 | floor(m/2) = floor(n/6) | 6 to 2 | 0 | $\{SSB_0, SSB_1\} \to RO_0, \ldots, \{SSB_0, SSB_1\} \to RO_5$ |
| 26 | 6 | 2 | floor(m/2) = n mod 6 or floor(m/2) = n | 1 to 2 | 1 | $\{SSB_0, SSB_1\} \to RO_0, \ldots, \{SSB_4, SSB_5\} \to RO_2$, $\{SSB_0, SSB_1\} \to RO_3, \ldots, \{SSB_4, SSB_5\} \to RO_5$, for ≤4 SSBs |
| 27 | 6 | 4 | floor(m/4) = floor(n/6) | 6 to 4 | 0 | $\{SSB_0, \ldots, SSB_3\} \to RO_0, \ldots, \{SSB_0, \ldots, SSB_3\} \to RO_5$ |
| 28 | 6 | 4 | k = floor(n/6) | 6 to 1 g | 1 | $\{SSB_0, \ldots, SSB_3\} \to RO_0$, $\{SSB_4, \ldots, SSB_7\} \to RO_1$, $\{SSB_0, \ldots, SSB_3\} \to RO_2$, $\{SSB_4, \ldots, SSB_7\} \to RO_3$, $\{SSB_0, \ldots, SSB_3\} \to RO_4$, $\{SSB_4, \ldots, SSB_7\} \to RO_5$ |
| 29-31 | | | | Reserved | | |

In another implementation, the network device may separately configure the quantity of frequency division multiplexed ROs (of a same time), for example, may configure values {F1, F2, F3, F4}. For example, F1, F2, F3, and F4 are respectively 1, 2, 4, and 6; or may be configured as 1, 2, 4, and 8; or may be 1, 2, 3, and 4; or may be some or all values of 1, 2, 3, 4, 5, 6, 7, 8, 9, 10, 11, 12, 13, 14, 15, and 16, for example, may be two, three, or four values thereof, for example, may be 1 and 2, or 1 and 4, with remaining values reserved. The network device may also separately configure the quantity N of synchronization signal blocks associated with one RO, and may configure the value of N as 1/F, 2/F, ½, 1, 2, 4, 5, 6, 7, or 8, and 1 group, 2 groups, 3 groups, 4 groups, 5 groups, 6 groups, 7 groups, or 8 groups, where F is any value or a factor of any value in {F1, F2, F3, F4}.

In an implementation, if a quantity of configured frequency division multiplexed ROs is F1, in this case, the quantity N of synchronization signal blocks (or synchronization signal block groups) associated with one RO should be a factor of F1 or an integer that is not greater than the quantity of actually transmitted synchronization signal blocks (or synchronization signal block groups). The terminal device does not desire that the base station configures another value. Alternatively, if the base station configures another value, the terminal device sets N to a preset value by default.

In an implementation, if a quantity of configured frequency division multiplexed ROs is F2, in this case, the quantity N of synchronization signal blocks (or synchronization signal block groups) associated with one RO should be a factor of F2 or an integer that is not greater than the quantity of actually transmitted synchronization signal blocks (or synchronization signal block groups). The terminal device does not desire that the base station configures another value. Alternatively, if the base station configures another value, the terminal device sets N to a preset value by default.

In an implementation, if a quantity of configured frequency division multiplexed ROs is F3, in this case, the quantity N of synchronization signal blocks (or synchronization signal block groups) associated with one RO should be a factor of F3 or an integer that is not greater than the quantity of actually transmitted synchronization signal blocks (or synchronization signal block groups). The terminal device does not desire that the base station configures another value. Alternatively, if the base station configures another value, the terminal device sets N to a preset value by default.

In an implementation, if a quantity of configured frequency division multiplexed ROs is F4, in this case, the quantity N of synchronization signal blocks (or synchronization signal block groups) associated with one RO should be a factor of F4 or an integer that is not greater than the quantity of actually transmitted synchronization signal blocks (or synchronization signal block groups). The terminal device does not desire that the base station configures another value. Alternatively, if the base station configures another value, the terminal device sets N to a preset value by default.

In another implementation, the network device may specify the maximum quantity of synchronization signal blocks associated with one RO as 16 or 8. The network device may configure a quantity of ROs based on both a quantity of synchronization signal blocks and a quantity of synchronization signal block groups. In a configuration method, the quantity of synchronization signal blocks that may be associated with one RO and the quantity of synchronization signal block groups that may be associated with one RO each is 1/F, ½, 1, 2, 3 or 4, 1 group, 2 groups, 3 or 4 groups, or all groups. The quantities may be represented by using 3 bits. The value 3 or 4 indicates that when a quantity of actually transmitted synchronization signal blocks in one group is 3 or 6, a value is set to 3; or when a quantity of actually transmitted synchronization signal blocks or a quantity of actually transmitted synchronization signal blocks in one group is 4 or 8, a value is set to 4. In a configuration method, the quantity of synchronization signal blocks that may be associated with one RO and the quantity of synchronization signal block groups that may be associated with one RO are 1/F, ½, 1, 2, 3, 4, or all. The quantities may be represented by using 3 bits. In a configuration method, the quantity of synchronization signal blocks that may be associated with one RO is classified into two types. A first type is many-to-one, which indicates that the quantity of synchronization signal blocks associated with one RO is a fractional value, to be specific, a plurality of synchronization signal blocks are associated with one RO. The quantity of synchronization signal blocks associated with one RO may be 1/F, ½, and 2/F, or may be 1/F and ½, or may be 1/F and 2/F, or may be 1/F. This part of configuration may be related to a value of F. A second type is that one RO is associated with one or more synchronization signal blocks, and is one-to-many and one-to-one. A value configured in the one-to-many manner may be based on the quantity of actually transmitted synchronization signal blocks or is related to a quantity of all synchronization signal blocks in one synchronization signal block group. Values that may be configured include 1, 2, 3, 4, 5, 6, 7, and 8, where 5, 6, and 7 may be configured together with 4 or 8. When 5, 6, and 7 are configured together with 8, the quantity of synchronization signal blocks that may be associated with one RO is one group or All. 3 and 4 may be configured together, or 3 and 4 may also be configured together with 5. In this case, the values that may be configured are 1, 2, 4, and all, or 1, 2, 3, and all, or 1, 2, Z, and all, where Z indicates 3 or 4, and is determined based on the quantity of actually transmitted synchronization signal blocks. All indicates a total quantity of synchronization signal blocks and synchronization signal block groups, or indicates the quantity of all synchronization signal blocks in one synchronization signal block group. When one RO is associated with one or more synchronization signal block groups, the network device may configure one RO to associate with N groups, where a value of N may be 1, 2, 3, 4, 5, 6, 7, or 8. During configuration, the network device may configure N as 1 group or all groups, or configure N as 1 or 2, or configure N as 1 or (2 or 3). The network device may configure all of the three types, or configure only the first two types.

The network device may alternatively jointly configure the quantity of synchronization signal blocks associated with one RO and a quantity of random access preambles associated with one synchronization signal block. In other words, a quantity of random access preambles associated with one RO is configured based on the quantity of synchronization signal blocks associated with one RO, as shown in Table 3, where NRO indicates a quantity of ROs, NSS indicates a quantity of SSs, and NP indicates the quantity of random access preambles associated with one synchronization signal block. Alternatively, some data in Table 3 may be jointly configured. For example, when the quantity of random access preambles associated with one RO is less than or equal to 4 or 1, a quantity of data bits for the quantity of random access preambles associated with one synchronization signal block is 4. When the quantity of synchronization signal blocks associated with one RO is greater than 4 or 1, it indicates that some data bits for the quantity of random access preambles associated with one synchronization signal block may be used to indicate the quantity of synchronization signal blocks associated with one RO.

TABLE 3

Joint configuration of the quantity of random access preambles associated with one synchronization signal block and the quantity of synchronization signal blocks associated with one RO

| NRO-NSS | 1-1 | 2-1 | F/2-1 | F-1 | 1-2 |
|---|---|---|---|---|---|
| NP | 4 × (1 – 16) | 4 × (1 – 16) | 4 × (1 – 16) | 4 × (1 – 16) | 2 × (1 – 16) |
| NRO-NSS | 1-4 (1-3) | 1-8 (1-7, 1-6, 1-5) | 1-10 | 1-12 | 1-14 |
| NP | 1 – 8 | 1 – 6 | 1 – 5 | 1 – 4 | 1 – 4 |

According to the communications method provided in this embodiment of this application, a time-frequency location of a random access resource associated with each downlink synchronization signal is indicated, so that the terminal device obtains, through downlink synchronization, a time-frequency location for sending an uplink random access signal, to avoid a blind attempt of the terminal device and a beam mismatch of the network device occurring when the network device receives a random access signal, thereby improving efficiency.

In a Long Term Evolution (long term evolution, LTE) communications system, when a terminal device sends a random access signal, it is not considered whether a time-frequency resource for sending the random access signal conflicts with a time-frequency resource for a periodic or a semi-statically or statically configured uplink signal. When the terminal device sends the periodic or the semi-statically or statically configured uplink signal, it is not considered whether the time-frequency resource for sending the periodic or the semi-statically or statically configured uplink signal conflicts with the time-frequency resource for random access. As a result, the random access signal or the periodic or the semi-statically or statically configured uplink signal is interfered with, and signal receiving performance deteriorates.

Therefore, a problem of a time-frequency resource conflict occurring when the foregoing uplink signal is sent needs to be considered.

The embodiments of this application provide another communications method and apparatus, so that a terminal device sends an uplink signal based on time-frequency resource indication information. In this way, a time-frequency resource conflict between uplink signals can be avoided and signal receiving performance is improved.

Figure 5:
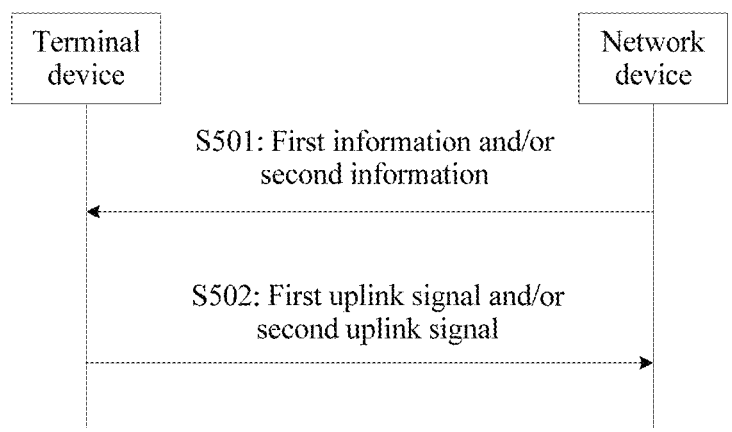
FIG. 5 is a schematic diagram of an interaction process of another communications method according to an embodiment of this application.

FIG. 5 is a schematic diagram of an interaction process of another communications method according to an embodiment of this application. The method may include the following steps:

S501: A network device sends first information and/or second information to a terminal device. The terminal device receives the first information and/or the second information sent by the network device. The first information is used to instruct to send a first uplink signal on a first time-frequency resource; and/or the second information is used to instruct to send a second uplink signal on a second time-frequency resource.

S502: The network device/terminal device further performs any step below:

when a third time-frequency resource in the first time-frequency resource indicated by the first information is included in the second time-frequency resource indicated by the second information, the terminal device sends the first uplink signal to the network device on a time-frequency resource other than the third time-frequency resource in the first time-frequency resource; and the network device receives the first uplink signal that is sent by the terminal device on the time-frequency resource other than the third time-frequency resource in the first time-frequency resource; or when a fourth time-frequency resource in the second time-frequency resource indicated by the second information is included in the first time-frequency resource indicated by the first information, the terminal device sends the second uplink signal to the network device on a time-frequency resource other than the fourth time-frequency resource in the second time-frequency resource; and the network device receives the second uplink signal that is sent by the terminal device on the time-frequency resource other than the fourth time-frequency resource in the second time-frequency resource; or when a third time-frequency resource in the first time-frequency resource indicated by the first information overlaps a fourth time-frequency resource in the second time-frequency resource indicated by the second information, the terminal device sends the first uplink signal to the network device on the first time-frequency resource, and/or the terminal device sends the second uplink signal to the network device on the second time-frequency resource; and the network device receives the first uplink signal that is sent by the terminal device on the first time-frequency resource, and/or the network device receives the second uplink signal that is sent by the terminal device on the second time-frequency resource.

In this embodiment, the first uplink signal is at least one of the following: a periodic (periodic) signal, a semi-static (semi-static) signal, a semi-persistent (semi-persistent) signal, a periodic sounding reference signal (sounding reference signal, SRS), a periodic demodulation reference signal (demodulation reference signal, DMRS), a periodic physical uplink shared channel (physical uplink shared channel, PUSCH) signal, a periodic physical uplink control channel (physical uplink control channel, PUCCH) signal, and a dynamic (dynamic) scheduling/configuration signal; and the second uplink signal is a random access signal. The first uplink signal (that is, a periodic or a semi-statically or statically configured uplink signal) is usually configured by the network device. Uplink signal sending time and frequency resource information of the first uplink signal may be or may be not indicated by using a downlink control channel. Alternatively, some information in uplink signal sending time and frequency resource information of the first uplink signal may be indicated by using a downlink control channel, and other time and frequency information is specified in advance by using RRC signaling, a MAC CE, or a PDCCH order. The information specified in advance periodically occurs in terms of time. The random access signal is used for uplink synchronization. A conflict between time-frequency resources for sending the first uplink signal and the second uplink signal should be reduced at a most extent or should not exist.

In practice, the first uplink signal usually occupies more time resources and/or frequency (bandwidth) resources, and time and frequency locations of the second uplink signal are cell-level configurations. As a result, an overlap or a partial overlap of time and frequency resource locations between the first uplink signal and second uplink signal cannot be avoided. In some cases, changing the time and frequency locations of the second uplink signal needs a relatively long time or relatively high overheads. Therefore, scheduling the first uplink signal in the time and frequency locations of the second uplink signal should be avoided as far as possible. If an overlap or a partial overlap cannot be avoided, puncturing or not sending an overlapped part of one of the signals is considered.

In this embodiment, before sending the first uplink signal and/or the second uplink signal, the terminal device receives the first information and/or the second information sent by the network device. The first information is used to instruct to send the first uplink signal on the first time-frequency resource; and/or the second information is used to instruct to send the second uplink signal on the second time-frequency resource. In other words, the network device indicates a time-frequency resource for sending an uplink signal.

Specifically, S501 includes:

receiving, by the terminal device by using at least one type of the following information, the first information and/or the second information sent by the network device, where the at least one type of the following information includes: system information, radio resource control (radio resource control, RRC) signaling, a downlink control channel, and a MAC CE.

After the terminal device receives the first information and/or the second information, the following several implementations for sending the first uplink signal and/or the second uplink signal are included based on specific cases:

In one implementation, when the third time-frequency resource in the first time-frequency resource indicated by the first information is included in the second time-frequency resource indicated by the second information, the terminal device sends the first uplink signal to the network device on a time-frequency resource other than the third time-frequency resource in the first time-frequency resource; and the network device receives the first uplink signal that is sent by the terminal device on the time-frequency resource other than the third time-frequency resource in the first time-frequency resource. Specifically, a conflicting time-frequency resource between the first time-frequency resource and the second time-frequency resource is the third time-frequency resource. If the terminal device does not consider a time-frequency resource conflict and directly sends the first uplink signal on the first time-frequency resource, because the first time-frequency resource conflicts with the second time-frequency resource used for sending the second uplink signal, signal receiving performance may be affected when the network device receives the first uplink signal and/or the second uplink signal. Therefore, the terminal device sends the first uplink signal to the network device on the time-frequency resource other than the third time-frequency resource in the first time-frequency resource, and the network device receives the first uplink signal that is sent by the terminal device on the time-frequency resource other than the third time-frequency resource in the first time-frequency resource. To be specific, the conflicting time-frequency resource is punctured, no signal is transmitted on this conflicting time-frequency resource, and rate matching is calculated based on an actually transmitted time-frequency resource. In this way, signal receiving performance of the first uplink signal and/or the second uplink signal can be improved.

In another implementation, when the fourth time-frequency resource in the second time-frequency resource indicated by the second information is included in the first time-frequency resource indicated by the first information, the terminal device sends the second uplink signal to the network device on the time-frequency resource other than the fourth time-frequency resource in the second time-frequency resource; and the network device receives the second uplink signal that is sent by the terminal device on the time-frequency resource other than the fourth time-frequency resource in the second time-frequency resource. Specifically, a conflicting time-frequency resource between the second time-frequency resource and the first time-frequency resource is the fourth time-frequency resource. If the terminal device does not consider a time-frequency resource conflict and directly sends the second uplink signal on the second time-frequency resource, because the second time-frequency resource conflicts with the first time-frequency resource used for sending the first uplink signal, signal receiving performance may be affected when the network device receives the first uplink signal and/or the second uplink signal. Therefore, the terminal device sends the second uplink signal to the network device on the time-frequency resource other than the fourth time-frequency resource in the second time-frequency resource, and the network device receives the second uplink signal that is sent by the terminal device on the time-frequency resource other than the fourth time-frequency resource in the second time-frequency resource. In this way, signal receiving performance of the first uplink signal and/or the second uplink signal can be improved.

In still another implementation, when the third time-frequency resource in the first time-frequency resource indicated by the first information overlaps the fourth time-frequency resource in the second time-frequency resource indicated by the second information, the terminal device sends the first uplink signal to the network device on the first time-frequency resource, and/or the terminal device sends the second uplink signal to the network device on the second time-frequency resource; and the network device receives the first uplink signal that is sent by the terminal device on the first time-frequency resource, and/or the network device receives the second uplink signal that is sent by the terminal device on the second time-frequency resource. Specifically, an application scenario of this implementation is that the terminal device sends the first uplink signal and/or the second uplink signal by using a first type of a transmission precoding type. The transmission precoding type includes the first type and a second type. When the transmission precoding type is the first type, the transmission precoding type is corresponding to a single carrier, for example, DFTs-OFDM, and for another example, a linear filtering single carrier. When the transmission precoding type is the second type, the transmission precoding type is corresponding to a multicarrier, for example, OFDM. When the transmission precoding type of the first type is used to send an uplink signal, a peak-to-average power ratio (peak-to-average power ratio, PAPR) increases if no uplink signal is sent on a conflicting time-frequency resource. Therefore, in this embodiment, for example, in the scenario (certainly, the scenario may alternatively be another scenario) in which the transmission precoding type of the first type is used to send an uplink signal, when the third time-frequency resource in the first time-frequency resource indicated by the first information overlaps the fourth time-frequency resource in the second time-frequency resource indicated by the second information, avoiding signal interference to the first uplink signal and the second uplink signal may be not considered, and the terminal device sends the first uplink signal on the first time-frequency resource and/or sends the second uplink signal on the second time-frequency resource. The network device receives the first uplink signal that is sent by the terminal device on the first time-frequency resource, and/or the network device receives the second uplink signal that is sent by the terminal device on the second time-frequency resource.

It should be noted that, a same terminal device may send the first uplink signal and the second uplink signal at a same time, or may send either of the first uplink signal and the second uplink signal at a time, in other words, send the first uplink signal and the second uplink signal at different times. When there are a plurality of terminal devices on the network and a time-frequency resource of one uplink signal may be shared by the plurality of terminal devices, for example, a time-frequency resource of the second uplink signal is shared and is a random access signal, in this case, the plurality of terminal devices send different uplink signals, for example, a terminal device 1 sends the first uplink signal and a terminal device 2 sends the second uplink signal. In this case, the terminal device 1 may send the first uplink signal in a manner described in any of the foregoing embodiments, and the terminal device 2 may send the second uplink signal in a manner described in any of the foregoing embodiments. The network device receives a corresponding uplink signal in a corresponding manner. To be specific, if the terminal device 1 sends no signal on a location of the third time-frequency resource that is overlapped with the time-frequency resource of the first uplink signal and the time-frequency resource of the second uplink signal, the network device needs to perform rate matching for the location of the third time-frequency resource when receiving the first uplink signal from the terminal device 1. Similarly, if the terminal device 2 sends no signal on a location of the fourth time-frequency resource that is common to the time-frequency resource of the second uplink signal and the time-frequency resource of the first uplink signal, the network device needs to perform rate matching for the location of the fourth time-frequency resource when receiving the second uplink signal from the terminal device 2.

Certainly, the network device may further indicate whether avoiding signal interference to the first uplink signal and the second uplink signal is considered and whether to send an uplink signal on a conflicting time-frequency resource. Therefore, further, the method further includes:

sending, by the network device, third information to the terminal device; and receiving, by the terminal device, the third information, where the third information includes an uplink signal transmission precoding type, and the uplink signal transmission precoding type includes a first type and a second type; and sending, by the terminal device, an uplink signal to the network device based on the first information, the second information, and the third information; and receiving, by the network device, the uplink signal.

In other words, in this implementation, the network device sends the third information, to indicate to the terminal device a transmission precoding type for sending an uplink signal.

Furthermore, the network device/terminal device further executes any step below:

when the uplink signal transmission precoding type is the first type, and/or the third time-frequency resource in the first time-frequency resource indicated by the first information overlaps the fourth time-frequency resource in the second time-frequency resource indicated by the second information, the terminal device sends the first uplink signal to the network device on the first time-frequency resource, and/or the terminal device sends the second uplink signal to the network device on the second time-frequency resource; and the network device receives the first uplink signal that is sent by the terminal device on the first time-frequency resource, and/or the network device receives the second uplink signal that is sent by the terminal device on the second time-frequency resource; or when the uplink signal transmission precoding type is the second type, and the third time-frequency resource in the first time-frequency resource indicated by the first information is included in the second time-frequency resource indicated by the second information, the terminal device sends the first uplink signal to the network device on a time-frequency resource other than the third time-frequency resource in the first time-frequency resource; and the network device receives the first uplink signal that is sent by the terminal device on the time-frequency resource other than the third time-frequency resource in the first time-frequency resource; or when the uplink signal transmission precoding type is the second type, and the fourth time-frequency resource in the second time-frequency resource indicated by the second information is included in the first time-frequency resource indicated by the first information, the terminal device sends the second uplink signal to the network device on a time-frequency resource other than the fourth time-frequency resource in the second time-frequency resource; and the network device receives the second uplink signal that is sent by the terminal device on the time-frequency resource other than the fourth time-frequency resource in the second time-frequency resource.

In specific implementation, if the uplink signal transmission precoding type indicated by the network device is the first type, it is considered that the third time-frequency resource in the first time-frequency resource indicated by the first information overlaps the fourth time-frequency resource in the second time-frequency resource indicated by the second information, the terminal device does not avoid signal interference to the first uplink signal and the second uplink signal and directly sends the first uplink signal on the first time-frequency resource and/or sends the second uplink signal on the second time-frequency resource. Alternatively, the terminal device may not consider the uplink signal transmission precoding type. For example, in another scenario in which avoiding signal interference may be not considered, the terminal device directly sends the first uplink signal on the first time-frequency resource and/or sends the second uplink signal on the second time-frequency resource.

If the uplink signal transmission precoding type is the second type, the terminal device needs to consider a time-frequency resource conflict or signal interference between the first uplink signal and the second uplink signal. To be specific, the terminal device sends the first uplink signal to the network device on a time-frequency resource other than the third time-frequency resource in the first time-frequency resource, and the network device receives the first uplink signal that is sent by the terminal device on the time-frequency resource other than the third time-frequency resource in the first time-frequency resource; and the terminal device sends the second uplink signal to the network device on a time-frequency resource other than the fourth time-frequency resource in the second time-frequency resource, and the network device receives the second uplink signal that is sent by the terminal device on the time-frequency resource other than the fourth time-frequency resource in the second time-frequency resource.

In this way, PAPR performance of transmission precoding of the first type is not affected, and impact on PAPR performance of transmission precoding of the second type is little. In addition, signal receiving performance is improved because no uplink signal is sent on a conflicting time-frequency resource.

Alternatively, the network device may further indicate whether to send the first uplink signal and/or the second uplink signal on a conflicting time-frequency resource, that is, indicate to the terminal device whether to perform a step in S502 or which step in S502 needs to be performed. In specific implementation, the network device may indicate, to the terminal device in system information, an RRC message, a MAC CE, a PDCCH, a control channel for scheduling a random access response (msg2), or a random access response (RAR) carried in msg2, whether to send the first uplink signal and/or the second uplink signal on a conflicting time-frequency resource. For example, the indication may be 1-bit information, where "1" indicates that sending an uplink signal on a conflicting time-frequency resource is avoided (or "1" indicates that sending an uplink signal on a conflicting time-frequency resource is avoided when the transmission precoding type is the second type, that is, OFDM), and "0" indicates that sending an uplink signal on a conflicting time-frequency resource does not need to be avoided. Alternatively, conversely, "0" indicates that sending an uplink signal on a conflicting time-frequency resource is avoided (or "0" indicates that sending an uplink signal on a conflicting time-frequency resource is avoided when the transmission precoding type is the second type, that is, OFDM), and "1" indicates that sending an uplink signal on a conflicting time-frequency resource does not need to be avoided. The foregoing system information may include system information of physical broadcast channel (PBCH) transmission, or system information of other channel transmission, or system information of user-request-based transmission. The RAR carried in the foregoing msg2 may be included in a MAC header or a MAC CE.

According to the communications method provided in this embodiment of this application, the terminal device sends an uplink signal based on time-frequency resource indication information. In this way, a time-frequency resource conflict between uplink signals can be avoided and signal receiving performance is improved. Specifically, the terminal device determines a location of a random access time-frequency resource based on the indication information. When sending an uplink signal, if a time-frequency resource of the uplink signal conflicts with a random access time-frequency resource, the terminal does not send the uplink signal on a time-frequency resource of the random access resource. Correspondingly, when receiving an uplink signal, the network device needs to perform rate matching based on a random access resource time-frequency location of the uplink signal and a time-frequency resource location of a random access resource.

Figure 6:
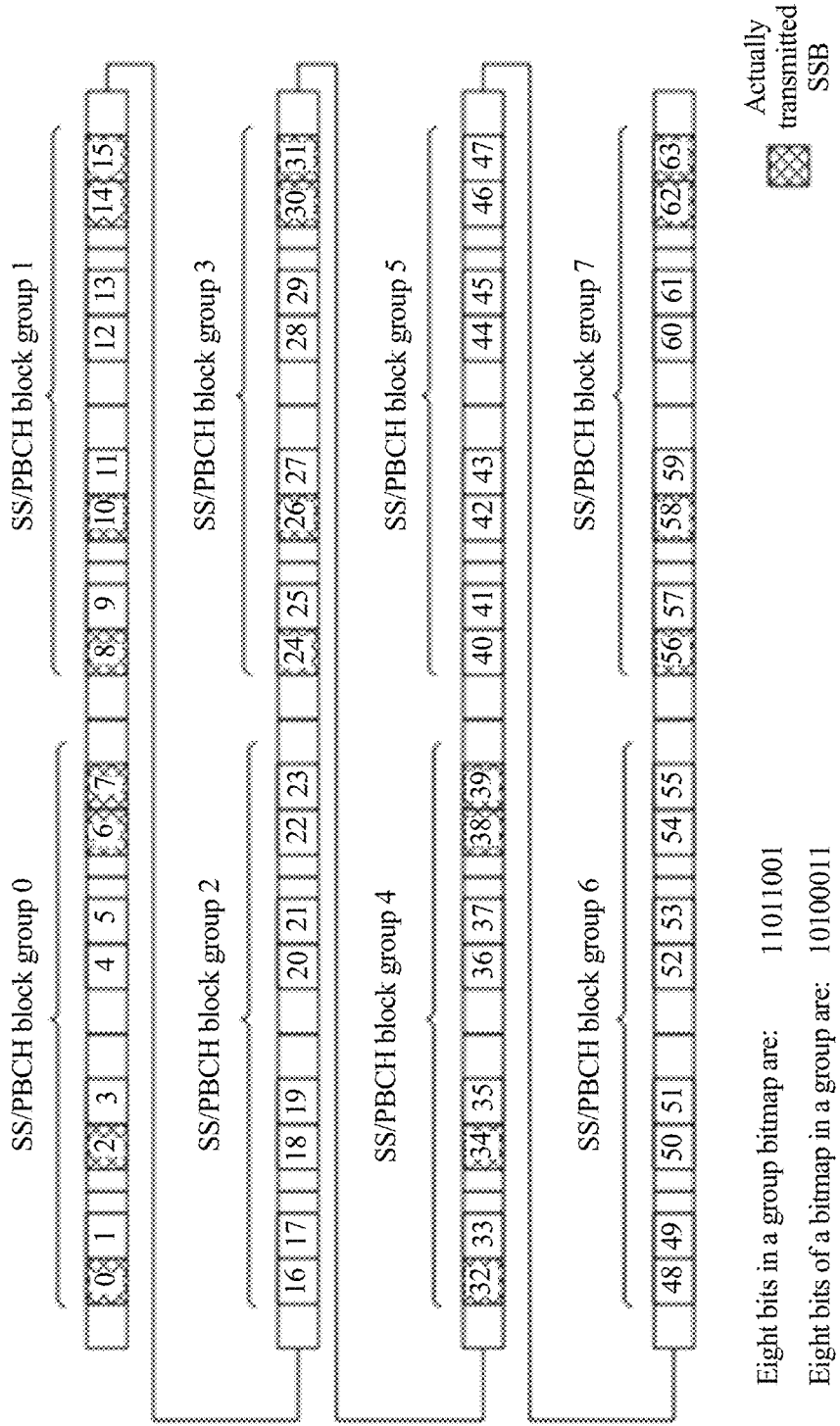
FIG. 6 is a schematic diagram of an indication of an actually transmitted synchronization signal block or synchronization signal block group.

In another embodiment, a current protocol supports transmission of up to 4, 8, or 64 synchronization signal blocks based on different frequency bands. In an actual system, the network device possibly transmits less than 4, 8, or 64 synchronization signal blocks. Therefore, the prior art supports the network device in notifying the terminal device of actually transmitted synchronization signal blocks, so that the terminal device performs a function such as downlink data rate matching, that is, these indicated transmitted synchronization signal blocks are staggered. For example, as shown in FIG. 6, in NR, a specific time location of an actually transmitted synchronization signal block is indicated by using RMSI bit mapping (also referred to as bitmap, bitmap) information. For a frequency band greater than 6 GHz, there are up to 64 synchronization signal blocks in one SS burst set. The 64 synchronization signal blocks are divided into a maximum of 8 groups, and 8-bit information is used to indicate whether the synchronization signal block groups are transmitted. Each group has a maximum of 8 synchronization signal blocks, and uses 8-bit information to indicate whether the synchronization signal blocks are sent. A total of 8+8=16 bits of information is used for indication. For a frequency band less than 6 GHz, one SS burst set has a maximum of 8 synchronization signal blocks and uses 8-bit information for indication. For example, for the frequency band greater than 6 GHz, information about actual transmission of synchronization signal blocks of the frequency band is 1101100110100011, and information about the groups of the frequency band is 11011001, indicating that synchronization signal block groups 0, 1, 3, 4, and 7 have actually transmitted synchronization signal blocks and other groups do not have actually transmitted synchronization signal blocks. Information inside a group is 10100011, indicating that synchronization signal blocks 0, 2, 6, and 7 inside the group are transmitted.

Specific notification methods are as follows:
(1) Indication in System Information:

When there are 64 synchronization signal blocks, the 64 synchronization signal blocks are divided into 8 groups, and each group has 8 synchronization signal blocks. In a specific indication, an 8-bit bitmap is used to indicate which group is transmitted, and another 8-bit bitmap is used to indicate which synchronization signal block in the group is transmitted.

When there are 8 synchronization signal blocks, an 8-bit bitmap is directly used to indicate which synchronization signal block is transmitted.

When there are 4 synchronization signal blocks, a 4-bit bitmap is directly used to indicate which synchronization signal block is transmitted.

(2) Indication in a MAC-CE and/or RRC Signaling and/or a PDCCH:

When there are 64/8/4 synchronization signal blocks, a 64/8/4-bit bitmap is directly used to indicate which synchronization signal block is transmitted.

Each synchronization signal block is associated with a specific RACH resource. For a specific association configuration method, refer to related embodiments of the present invention. Details are not described herein again. Based on this association, the network device may send a RACH resource pattern (pattern) of a specific conflicting or non-conflicting resource to a connected-mode or idle-mode terminal device on basis of the foregoing existing synchronization signal block indication. For the indication, a single carrier or a multicarrier may be used to send only uplink data or any waveform is suitable.

The terminal device may determine a time-frequency resource location of an uplink signal based on at least one of synchronization signal location information, random access configuration information, and information about mapping between a synchronization signal and a random access signal.

Specifically, in an implementation, an indication is performed based on an actually transmitted synchronization signal block.

The terminal device may reuse the existing indication to indicate whether to send uplink data on a conflicting RACH resource. If an indication indicates that a synchronization signal block is transmitted, the terminal device needs to avoid a RACH resource associated with this synchronization signal block. In this way, no additional indication information is required.

In another implementation, an indication is performed based on an association relationship between a synchronization signal block and a RACH resource.

In the prior art, a synchronization signal block is associated with a RACH resource, and association of a plurality of synchronization signal blocks with a same RACH resource is supported. Therefore, an indication may be performed based on a synchronization signal block, and a same indication may be provided for a plurality of synchronization signal blocks associated with a same RACH resource. A specific indication method is described below:

In still another implementation, an indication is performed based on a maximum quantity of possibly transmitted synchronization signal blocks.

The network device may transmit 64/8/4 synchronization signal blocks based on a frequency band. It is assumed that there are a maximum of 8 synchronization signal blocks for a frequency band, and 2 synchronization signal blocks are associated with a same RACH resource. Only a 4-bit instead of an 8-bit indication is required, and the indication does not depend on an actually transmitted synchronization signal block described above. For example, if "1001" is indicated to a user, the user cannot send uplink data on a RACH resource associated with synchronization signal blocks 1, 2, 7, and 8. Certainly, the indication may alternatively indicate that the user cannot send uplink data on a RACH resource associated with synchronization signal blocks 3, 4, 5, and 6. This depends on a specific meaning of "1" or "0" of a bit.

In yet another implementation, an indication is performed based on an actually transmitted synchronization signal block.

An indication performed based on an actually transmitted synchronization signal block notified by the network device may further reduce a quantity of bits. For example, it is assumed that there are a maximum of 8 synchronization signal blocks for a frequency band. However, according to an indication of the network device, only 6 of the 8 synchronization signal blocks (assuming that synchronization signal blocks 1, 2, 5, 6, 7, and 8 are transmitted) are actually transmitted, and 2 synchronization signal blocks are associated with a same RACH resource. In this case, only a 3-bit indication is required. For example, if "001" is indicated to a user, the user cannot send uplink data on a RACH resource associated with synchronization signal blocks 7 and 8. Certainly, the indication may alternatively indicate that the user cannot send uplink data on a RACH resource associated with synchronization signal blocks 1, 2, 5, and 6. This depends on a specific meaning of "1" or "0" of a bit. Because synchronization signal block 3 and 4 are not transmitted, the indication is unrelated to the synchronization signal blocks 3 and 4, and is associated with only the actually transmitted synchronization signal blocks 1, 2, 5, 6, 7, and 8.

In other words, an indication is performed based on a time-frequency length of a random access resource associated with an actually transmitted synchronization signal block. For example, if the time-frequency resource length of the random access resource associated with the actually transmitted synchronization signal block (or a quantity of random access time-frequency resources) is K, a bitmap with a length of K is used for indication, where K is an integer, for example, K=1 to 128. In still yet another implementation, an indication is performed based on a RACH configuration.

A RACH resource is configured by using RACH configuration information in a system message, and is repeated according to a specific period, for example, 10/20/40/80/160 ms. Therefore, a RACH resource configured in one period may be directly indicated. For example, if RACH resources are configured in X time domains, an X-bit bitmap is used for an indication. Each bit indicates whether the terminal device needs to avoid a conflict with a RACH resource in one time domain during uplink data transmission. A time length of the X time domains may be based on a random access preamble format and a subcarrier spacing of the random access preamble format, where X is an integer, for example, X=1 to 1024.

For another example, there are F frequency division multiplexed random access resources in X time domains, an indication may be performed based on at least one of X and F. For example, an F-bit bitmap is indicated, to indicate that a frequency location conflict indicated in the F-bit bitmap needs to be processed for an uplink signal, where F is an integer, for example, F=1 to 128. For another example, a Y-bit bitmap is indicated, to indicate that a time-frequency location conflict indicated in the Y-bit bitmap needs to be processed for an uplink signal. For example, Y=F×X.

It should be noted that, the RACH configuration information includes a physical random access channel (PRACH) configuration index and a random access preamble subcarrier spacing field. The PRACH configuration index and the random access preamble subcarrier spacing field jointly determine random access time resource information and/or a random access preamble subcarrier spacing. For example, the random access preamble subcarrier spacing field has a length of 1 bit. When a frequency band for random access is a first frequency band (for example, less than 6 GHz), time information is determined based on the PRACH configuration index, the random access preamble subcarrier spacing field, and a preset first random access configuration table. If the random access preamble format includes information about the random access preamble subcarrier spacing, the random access preamble subcarrier spacing field may further be used to indicate time information of a random access resource. For example, when the random access preamble format is preamble formats 0 to 3, a first time is indicated if the random access preamble subcarrier spacing field is 0, and a second time is indicated if the random access preamble subcarrier spacing field is 1. For example, as shown in Table 3, a preamble format F may be preamble formats 0 to 3 defined in 5G, and the random access preamble subcarrier spacing may be determined based on a value of this format. P may be understood as a random access configuration period or a random access resource period, and a value of P may be represented by using millisecond. For example, P is any one of 1 ms, 5 ms, 10 ms, 20 ms, 40 ms, 80 ms, 160 ms, 320 ms, and 640 ms, where ms indicates a time unit millisecond. Alternatively, a value of P may be represented by using a quantity of frames, for example, 0.5, 1, 2, 4, 8, 16, 32, 64, 128, or 256 frames, where each frame is 10 ms. Q indicates a time location (for example, a frame or a subframe) in which the random access resource appears in one period (for example, a random access configuration period P). For example, when P is greater than 1, Q may be 0 to P−1. A subframe index is a time location in which a frame appears in one period. A length of one subframe is 1 millisecond, and a start symbol may be any value from 0 to 13.

TABLE 4

Random access configuration table (first frequency band)

| Random access configuration index | Preamble format | x | y | Subframe index | Start OFDM symbol |
|---|---|---|---|---|---|
| I | F | P | Q | N | S |

In Table 4, $n_{SFN}$ mod x=y.

For example, when a random access preamble format specified by a random access configuration index is preamble formats 0 to 3, it indicates that the random access configuration period P is a first time value if the random access preamble subcarrier spacing field is 0, and it indicates that the random access configuration period P is a second time value if the random access preamble subcarrier spacing field is 1.

For another example, when a random access preamble format specified by a random access configuration index is preamble formats 0 to 3, it indicates that Q is a first time value if the random access preamble subcarrier spacing field is 0, and it indicates that Q is a second time value if the random access preamble subcarrier spacing field is 1.

For another example, when a random access preamble format specified by a random access configuration index is preamble formats 0 to 3, it indicates that N is a first time value if the random access preamble subcarrier spacing field is 0, and it indicates that N is a second time value if the random access preamble subcarrier spacing field is 1.

For another example, when a random access preamble format specified by a random access configuration index is preamble formats 0 to 3, it indicates that S is a first time value if the random access preamble subcarrier spacing field is 0, and it indicates that S is a second time value if the random access preamble subcarrier spacing field is 1.

Figure 7:
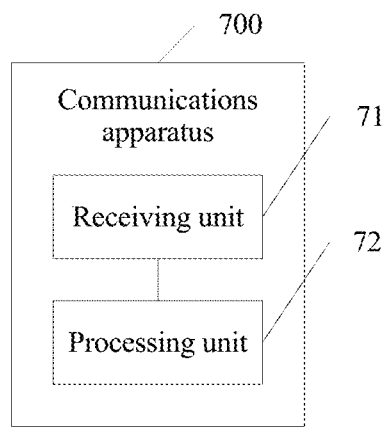
FIG. 7 is a schematic structural diagram of a communications apparatus according to an embodiment of this application.

FIG. 7 is a schematic structural diagram of a communications apparatus 700 according to an embodiment of this application. The apparatus 700 may include a receiving unit 71 and a processing unit 72.

The receiving unit 71 is configured to obtain downlink synchronization signal block index information, for example, receive a downlink signal, where the downlink signal carries the synchronization signal block index information.

The receiving unit 71 is further configured to receive information used to indicate an association relationship between a random access occasion RO and a synchronization signal block.

The processing unit 72 is configured to obtain the synchronization signal block index information and the association relationship between a random access occasion RO and a synchronization signal block from the information received by the receiving unit 71, and access a network device on an RO corresponding to the synchronization signal block index information.

The association relationship between an RO and a synchronization signal block is at least one of the following:

a quantity of synchronization signal blocks associated with one RO is at least 1/F, or is P at most, where F is a quantity of ROs in frequency domain, and P is related to a quantity of actually transmitted synchronization signal blocks; and/or N synchronization signal blocks or N synchronization signal block groups are associated with one RO in frequency domain or are associated with all ROs in frequency domain; and/or the first RACH resources in every X RACH resource configuration periods Y are associated with same synchronization signal blocks when one random access resource configuration period is P, where P and X are integers and Y is equal to P multiplied by X.

In an implementation, when the association relationship is that N synchronization signal blocks or N synchronization signal block groups are associated with one RO in frequency domain or are associated with all ROs in frequency domain, the receiving unit 71 is further configured to receive indication information from the network device, where the indication information is used to indicate that the N synchronization signal blocks or the N synchronization signal block groups are associated with one RO in frequency domain, or is used to indicate that the N synchronization signal blocks or the N synchronization signal block groups are associated with all the ROs in frequency domain.

In another implementation, when one random access resource configuration period is P, and the first RACH resources in every X RACH resource configuration periods are associated with same synchronization signal blocks, X is received from the network device or is prestored; and/or Y is received from the network device or is prestored.

In still another implementation, a value of Y is 10 ms, 20 ms, 40 ms, 80 ms, 160 ms, 320 ms, or 640 ms.

In yet another implementation, a value of X is related to a quantity of synchronization signal blocks, or a value of X is related to a quantity of random access resources in one random access resource configuration period, or a value of X is 1, 2, 4, 8, or 16.

In still yet another implementation, when one random access resource configuration period is P, and the first random access resources in every X random access resource configuration periods are associated with same synchronization signal blocks, if there are one or more remaining random access resources, the communications apparatus does not access the network device on the remaining random access resource.

In a further implementation, when one random access resource configuration period is P, and the first random access resources in every X random access resource configuration periods are associated with same synchronization signal blocks, if there are one or more remaining random access resources, the one or more remaining random access resources are associated starting from the first synchronization signal block or the last synchronization signal block or a next synchronization signal block of an end synchronization signal block in previous X periods, or any one or more of the foregoing three association relationships are used in different X periods.

In a still further implementation, when the association relationship is that N synchronization signal blocks or N synchronization signal block groups are associated with one RO in frequency domain or are associated with all ROs in frequency domain, if a quantity N of actually transmitted synchronization signal blocks or synchronization signal block groups cannot be exactly divided by a quantity, configured by the network device, of synchronization signal blocks associated with one RO, after a quantity of synchronization signal blocks or synchronization signal block groups are associated with a corresponding RO, where the quantity is an integer multiple of the quantity configured by the network device, a remaining synchronization signal block or synchronization signal block group is associated with another one or more ROs.

According to the communications apparatus provided in this embodiment of this application, a time-frequency location of a random access resource associated with each downlink synchronization signal is indicated, so that a terminal device obtains, through downlink synchronization, a time-frequency location for sending an uplink random access signal, to avoid a blind attempt of the terminal device and a beam mismatch of the network device occurring when the network device receives a random access signal, thereby improving efficiency.

Figure 8:
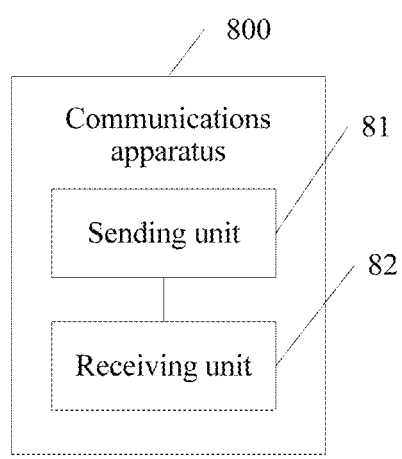
FIG. 8 is a schematic structural diagram of another communications apparatus according to an embodiment of this application.

FIG. 8 is a schematic structural diagram of another communications apparatus according to an embodiment of this application. The apparatus 800 may include a sending unit 81 and a receiving unit 82.

The sending unit 81 is configured to send downlink synchronization signal block index information to a terminal device, for example, the sending unit 81 sends a downlink synchronization signal block, where the synchronization signal block carries synchronization signal block index information.

The sending unit 81 is further configured to send information used to indicate an association relationship between a random access resource RO and a synchronization signal block to the terminal device. The sending unit is further configured to send random access channel RACH configuration information to the terminal device. For details, refer to descriptions in the foregoing embodiments.

The receiving unit 82 is configured to receive a random access signal that is sent by the terminal device on an RO corresponding to the synchronization signal block index information.

According to the communications apparatus provided in this embodiment of this application, a time-frequency location of a random access resource associated with each downlink synchronization signal is indicated, so that the terminal device obtains, through downlink synchronization, a time-frequency location for sending an uplink random access signal, to avoid a blind attempt of the terminal device and a beam mismatch of a network device occurring when the network device receives a random access signal, thereby improving efficiency.

Figure 9:
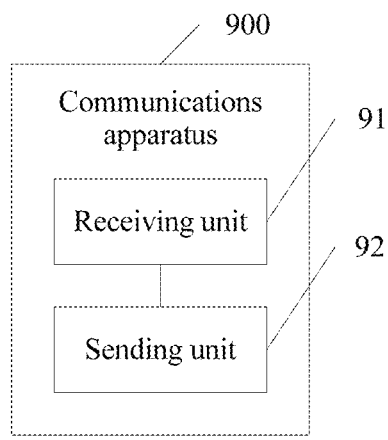
FIG. 9 is a schematic structural diagram of still another communications apparatus according to an embodiment of this application.

FIG. 9 is a schematic structural diagram of still another communications apparatus according to an embodiment of this application. The apparatus 900 may include a receiving unit 91 and a sending unit 92.

The receiving unit 91 is configured to receive first information and/or second information sent by a network device, where the first information is used to instruct to send a first uplink signal on a first time-frequency resource; and/or the second information is used to instruct to send a second uplink signal on a second time-frequency resource.

The sending unit 92 is configured to: when a third time-frequency resource in the first time-frequency resource indicated by the first information is included in the second time-frequency resource indicated by the second information, send the first uplink signal to the network device on a time-frequency resource other than the third time-frequency resource in the first time-frequency resource; or further configured to: when a fourth time-frequency resource in the second time-frequency resource indicated by the second information is included in the first time-frequency resource indicated by the first information, send the second uplink signal to the network device on a time-frequency resource other than the fourth time-frequency resource in the second time-frequency resource; or further configured to: when a third time-frequency resource in the first time-frequency resource indicated by the first information overlaps a fourth time-frequency resource in the second time-frequency resource indicated by the second information, send the first uplink signal to the network device on the first time-frequency resource, and/or send the second uplink signal to the network device on the second time-frequency resource.

In an implementation, the first uplink signal is at least one of the following: a periodic signal, a semi-static signal, a semi-persistent signal, a periodic sounding reference signal, a periodic demodulation reference signal, a periodic physical uplink shared channel signal, a periodic physical uplink control channel signal, and a dynamic scheduling/configuration signal; and the second uplink signal is a random access signal.

In another implementation, the receiving unit 91 is specifically configured to receive, by using at least one type of the following information, the first information and/or the second information sent by the network device, where the at least one type of the following information includes: system information, radio resource control signaling, a downlink control channel, and a Media Access Control control element MAC CE.

In still another implementation, the receiving unit 91 is further configured to receive third information, where the third information includes an uplink signal transmission precoding type, and the uplink signal transmission precoding type includes a first type and a second type; and the sending unit 92 is further configured to send an uplink signal to the network device based on the first information, the second information, and the third information.

In yet another implementation:

when the uplink signal transmission precoding type is the first type, and/or the third time-frequency resource in the first time-frequency resource indicated by the first information overlaps the fourth time-frequency resource in the second time-frequency resource indicated by the second information, the sending unit 92 is further configured to send the first uplink signal to the network device on the first time-frequency resource, and/or the sending unit 92 is further configured to send the second uplink signal to the network device on the second time-frequency resource; or when the uplink signal transmission precoding type is the second type, and the third time-frequency resource in the first time-frequency resource indicated by the first information is included in the second time-frequency resource indicated by the second information, the sending unit 92 is further configured to send the first uplink signal to the network device on a time-frequency resource other than the third time-frequency resource in the first time-frequency resource; or when the uplink signal transmission precoding type is the second type, and the fourth time-frequency resource in the second time-frequency resource indicated by the second information is included in the first time-frequency resource indicated by the first information, the sending unit 92 is further configured to send the second uplink signal to the network device on a time-frequency resource other than the fourth time-frequency resource in the second time-frequency resource.

According to the communications apparatus provided in this embodiment of this application, a terminal device sends an uplink signal based on time-frequency resource indication information. In this way, a time-frequency resource conflict between uplink signals can be avoided and signal receiving performance is improved.

Figure 10:
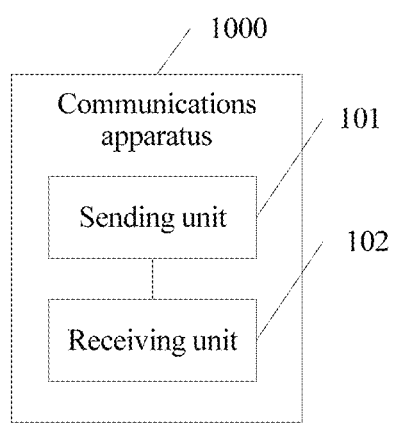
FIG. 10 is a schematic structural diagram of yet another communications apparatus according to an embodiment of this application.

FIG. 10 is a schematic structural diagram of yet another communications apparatus according to an embodiment of this application. The apparatus 1000 may include a sending unit 101 and a receiving unit 102.

The sending unit 101 is configured to send first information and/or second information to a terminal device, where the first information is used to instruct to send a first uplink signal on a first time-frequency resource; and/or the second information is used to instruct to send a second uplink signal on a second time-frequency resource; and when a third time-frequency resource in the first time-frequency resource indicated by the first information is included in the second time-frequency resource indicated by the second information, the receiving unit 102 is configured to receive the first uplink signal that is sent by the terminal device on a time-frequency resource other than the third time-frequency resource in the first time-frequency resource; or when a fourth time-frequency resource in the second time-frequency resource indicated by the second information is included in the first time-frequency resource indicated by the first information, the receiving unit 102 is configured to receive the second uplink signal that is sent by the terminal device on a time-frequency resource other than the fourth time-frequency resource in the second time-frequency resource; or when a third time-frequency resource in the first time-frequency resource indicated by the first information overlaps a fourth time-frequency resource in the second time-frequency resource indicated by the second information, the receiving unit 102 is configured to receive the first uplink signal that is sent by the terminal device on the first time-frequency resource, and/or the receiving unit 102 is configured to receive the second uplink signal that is sent by the terminal device on the second time-frequency resource. In this aspect, the terminal device sends an uplink signal based on time-frequency resource indication information. In this way, a time-frequency resource conflict between uplink signals can be avoided and signal receiving performance of a network device is improved.

In a possible implementation, the sending unit 101 is further configured to send third information to the terminal device, where the third information includes an uplink signal transmission precoding type, and the uplink signal transmission precoding type includes a first type and a second type; and the receiving unit 102 is further configured to receive an uplink signal that is sent by the terminal device based on the first information, the second information, and the third information.

In another possible implementation, when the uplink signal transmission precoding type is the first type, and/or the third time-frequency resource in the first time-frequency resource indicated by the first information overlaps the fourth time-frequency resource in the second time-frequency resource indicated by the second information, the receiving unit 102 is configured to receive the first uplink signal that is sent by the terminal device on the first time-frequency resource, and/or the receiving unit 102 is configured to receive the second uplink signal that is sent by the terminal device on the second time-frequency resource; or when the uplink signal transmission precoding type is the second type, and the third time-frequency resource in the first time-frequency resource indicated by the first information is included in the second time-frequency resource indicated by the second information, the receiving unit 102 is configured to receive the first uplink signal that is sent by the terminal device on a time-frequency resource other than the third time-frequency resource in the first time-frequency resource; or when the uplink signal transmission precoding type is the second type, and the fourth time-frequency resource in the second time-frequency resource indicated by the second information is included in the first time-frequency resource indicated by the first information, the receiving unit 102 is configured to receive the second uplink signal that is sent by the terminal device on a time-frequency resource other than the fourth time-frequency resource in the second time-frequency resource.

According to the communications apparatus provided in this embodiment of this application, the terminal device sends an uplink signal based on time-frequency resource indication information. In this way, a time-frequency resource conflict between uplink signals can be avoided and signal receiving performance of the network device is improved.

The communications apparatus provided in FIG. 7 is corresponding to the method embodiment in FIG. 3. The communications apparatus provided in FIG. 9 is corresponding to the method embodiment in FIG. 5. All descriptions of the method embodiments are applicable to the communications apparatuses.

The communications apparatuses in FIG. 3 and FIG. 5 of this application each may be a terminal device, or a chip or an integrated circuit mounted in a terminal device.

Figure 11:
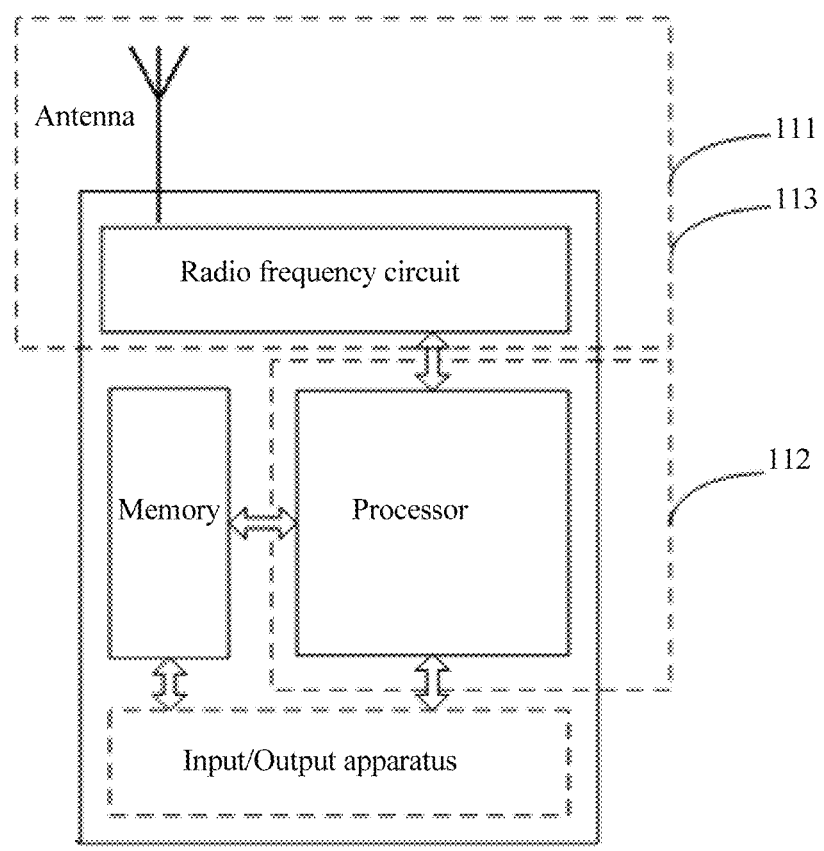
FIG. 11 is a schematic structural diagram of hardware of a communications apparatus according to an embodiment of this application.

That the communications apparatus is a terminal device is used as an example. FIG. 11 is a schematic structural diagram of a simplified terminal device. For ease of understanding and illustration, in FIG. 11, that the terminal device is a mobile phone is used as an example. As shown in FIG. 11, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send radio frequency signals in a form of an electromagnetic wave. The input/output apparatus, such as a touchscreen, a display, or a keyboard, is mainly configured to: receive data entered by a user and output data to the user. It should be noted that terminal devices of some types may not have the input/output apparatus.

When data needs to be sent, after performing baseband processing on the data to be sent, the processor outputs a baseband signal to the radio frequency circuit. The radio frequency circuit performs radio frequency processing on the baseband signal and sends a radio frequency signal to outside in a form of an electromagnetic wave by using the antenna. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data. For ease of description, FIG. 11 shows only one memory and processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a receiving and sending function may be considered as a receiving unit and a sending unit of the terminal device (or may be collectively referred to as a transceiver unit), and the processor having a processing function may be considered as a processing unit of the terminal device. As shown in FIG. 11, the terminal device includes a receiving unit 111, a processing unit 112, and a sending unit 113. The receiving unit 111 may also be referred to as a receiver, a receiver machine, a receiver circuit, or the like. The sending unit 113 may also be referred to as a sender, a transmitter, a transmitter machine, a transmitter circuit, or the like. The processing unit may also be referred to as a processor, a processing board, a processing module, a processing apparatus, or the like.

For example, in an embodiment, the receiving unit 111 is configured to perform S301 and S302 in the embodiment shown in FIG. 3. The processing unit 112 is configured to perform S303 in the embodiment shown in FIG. 3.

For example, in another embodiment, the receiving unit 111 is configured to perform S501 in the embodiment shown in FIG. 5. The sending unit 113 is configured to perform S502 in the embodiment shown in FIG. 5.

An embodiment of this application further provides a communications apparatus. The communications apparatus is configured to perform the foregoing communications method. The foregoing communications method may be completely or partially implemented by hardware or software. When hardware is used for implementation, in an embodiment, the communications apparatus includes: a receiver, configured to obtain downlink synchronization signal block index information, and further configured to receive information used to indicate an association relationship between a random access occasion RO and a synchronization signal block; and a transmitter, configured to access a network device on an RO corresponding to the synchronization signal block index information. In another embodiment, the communications apparatus includes: a receiver, configured to receive first information and/or second information sent by a network device, where the first information is used to instruct to send a first uplink signal on a first time-frequency resource, and/or the second information is used to instruct to send a second uplink signal on a second time-frequency resource; and a transmitter, configured to: when a third time-frequency resource in the first time-frequency resource indicated by the first information is included in the second time-frequency resource indicated by the second information, send the first uplink signal to the network device on a time-frequency resource other than the third time-frequency resource in the first time-frequency resource; or further configured to: when a fourth time-frequency resource in the second time-frequency resource indicated by the second information is included in the first time-frequency resource indicated by the first information, send the second uplink signal to the network device on a time-frequency resource other than the fourth time-frequency resource in the second time-frequency resource; or further configured to: when a third time-frequency resource in the first time-frequency resource indicated by the first information overlaps a fourth time-frequency resource in the second time-frequency resource indicated by the second information, send the first uplink signal to the network device on the first time-frequency resource, and/or send the second uplink signal to the network device on the second time-frequency resource.

Optionally, in specific implementation, the communications apparatus may be a chip or an integrated circuit.

Optionally, when the communications method in the foregoing embodiment is completely or partially implemented by software, the communications apparatus includes: a memory, configured to store a program; and a processor, configured to execute the program stored by the memory. When the program is executed, the communications apparatus is enabled to implement the communications method provided in the foregoing embodiment.

Optionally, the memory may be a physically independent unit, or may be integrated with the processor.

Optionally, when the communications method in the foregoing embodiment is completely or partially implemented by software, the communications apparatus may include only a processor. A memory configured to store a program is located outside the communications apparatus. The processor is connected to the memory through a circuit/wire, and is configured to read and execute the program stored in the memory.

The processor may be a central processing unit (CPU), a network processor (NP), or a combination of a CPU and an NP.

The processor may further include a hardware chip. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), a generic array logic (GAL), or any combination thereof.

The memory may include a volatile memory, for example, a random access memory (RAM). The memory may also include a non-volatile memory, for example, a flash memory, a hard disk drive (HDD), or a solid-state drive (SSD). The memory may further include a combination of the foregoing types of memories.

The communications apparatus provided in FIG. 8 is corresponding to the method embodiment in FIG. 3. The communications apparatus provided in FIG. 10 is corresponding to the method embodiment in FIG. 5. All descriptions of the method embodiments are applicable to the communications apparatuses.

The communications apparatus in this application may be a network device, or a chip or an integrated circuit installed in a network device.

Figure 12:
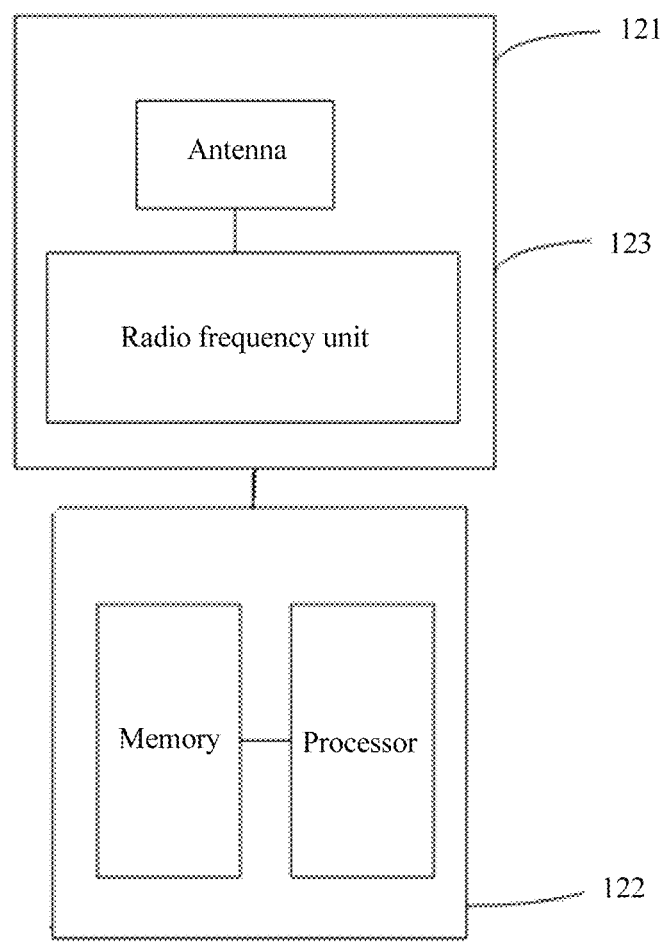
FIG. 12 is a schematic structural diagram of hardware of another communications apparatus according to an embodiment of this application.

That the communications apparatus is a network device is used as an example. FIG. 12 is a schematic structural diagram of a simplified network device. The network device includes a radio frequency signal receiving and sending and conversion part and a 122 part, and the radio frequency signal receiving and sending and conversion part further includes a receiving unit 121 part and a sending unit 123 part (which are also collectively referred to as a transceiver unit). The radio frequency signal receiving and sending and conversion part is mainly configured to: perform radio frequency signal receiving and sending and perform conversion between a radio frequency signal and a baseband signal. The 122 part is mainly configured to: perform baseband processing, control the network device, and the like. The receiving unit 121 may also be referred to as a receiver, a receiver machine, a receiver circuit, or the like. The sending unit 123 may also be referred to as a sender, a transmitter, a transmitter machine, a transmitter circuit, or the like. The 122 part is usually a control center of the network device, or may be usually referred to as a processing unit, configured to control the network device to perform the steps performed by the network device in FIG. 3 or FIG. 5. For details, refer to descriptions of the related parts.

The 122 part may include one or more boards. Each board may include one or more processors and one or more memories, and the processor is configured to read and execute a program in the memory, to implement a baseband processing function and control the network device. If there are a plurality of boards, the boards may be interconnected to enhance a processing capability. In an optional implementation, alternatively, the plurality of boards may share one or more processors, or the plurality of boards share one or more memories, or the plurality of boards share one or more processors at the same time.

For example, in an embodiment, the sending unit 123 is configured to perform steps S301 and S302 in the embodiment shown in FIG. 3. The receiving unit 121 is configured to perform step S303 in the embodiment shown in FIG. 3.

For example, in another embodiment, the sending unit 123 is configured to perform step S501 in the embodiment shown in FIG. 5. The receiving unit 121 is configured to perform step S302 in the embodiment shown in FIG. 5.

An embodiment of this application further provides a communications apparatus. The communications apparatus is configured to perform the foregoing communications method. The foregoing communications method may be completely or partially implemented by hardware or software. When hardware is used for implementation, in an embodiment, the communications apparatus includes: a transmitter, configured to send downlink synchronization signal block index information to a terminal device, and further configured to send information used to indicate an association relationship between a random access resource RO and a synchronization signal block; and a receiver, configured to receive a random access signal that is sent by the terminal device on an RO corresponding to the synchronization signal block index information. In another embodiment, the communications apparatus includes: a transmitter, configured to send first information and/or second information to a terminal device; and a receiver, configured to: when a third time-frequency resource in a first time-frequency resource indicated by the first information is included in a second time-frequency resource indicated by the second information, receive a first uplink signal that is sent by the terminal device on a time-frequency resource other than the third time-frequency resource in the first time-frequency resource; or when a fourth time-frequency resource in a second time-frequency resource indicated by the second information is included in a first time-frequency resource indicated by the first information, receive a second uplink signal that is sent by the terminal device on a time-frequency resource other than the fourth time-frequency resource in the second time-frequency resource; or when a third time-frequency resource in a first time-frequency resource indicated by the first information overlaps a fourth time-frequency resource in a second time-frequency resource indicated by the second information, receive a first uplink signal that is sent by the terminal device on the first time-frequency resource, and/or receive a second uplink signal that is sent by the terminal device on the second time-frequency resource.

Optionally, in specific implementation, the communications apparatus may be a chip or an integrated circuit.

Optionally, when the communications method in the foregoing embodiment is completely or partially implemented by software, the communications apparatus includes: a memory, configured to store a program; and a processor, configured to execute the program stored by the memory. When the program is executed, the communications apparatus is enabled to implement the communications method provided in the foregoing embodiment.

Optionally, the memory may be a physically independent unit, or may be integrated with the processor.

Optionally, when the communications method in the foregoing embodiment is completely or partially implemented by software, the communications apparatus may include only a processor. A memory configured to store a program is located outside the communications apparatus. The processor is connected to the memory through a circuit/wire, and is configured to read and execute the program stored in the memory.

The processor may be a CPU, an NP, or a combination of a CPU and an NP.

The processor may further include a hardware chip. The hardware chip may be an ASIC, a PLD, or a combination thereof. The PLD may be a CPLD, an FPGA, a GAL, or any combination thereof.

The memory may include a volatile memory, such as a RAM. Alternatively, the memory may include a non-volatile memory, such as a flash memory, a hard disk drive, or a solid state drive. Alternatively, the memory may include a combination of the foregoing types of memories.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium, or may be transmitted by using the computer-readable storage medium. The computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state drive (SSD)), or the like.

A person of ordinary skill in the art may understand that all or some of the processes of the methods in the embodiments may be implemented by a computer program instructing related hardware. The program may be stored in a computer readable storage medium. When being executed, the program may include the procedures of the foregoing method embodiments. The foregoing storage medium includes: any medium that can store program code, such as a read-only memory (ROM), a random access memory (RAM), a magnetic disk, or an optical disc.

What is claimed is:

1. A communications apparatus, comprising:
   one or more non-transitory memories configured to store instructions; and
   one or more processors coupled to the one or more non-transitory memories and configured to execute the instructions to cause the apparatus to:
   receive at least one synchronization signal block, information used to indicate a mapping relationship between a respective synchronization signal block and a random access occasion, and random access channel (RACH) configuration information; and
   determine a random access association period Y based on the information received by the apparatus,
   wherein the random access association period Y comprises X random access configuration periods P, and a value of X is any one of 2, 4, 8, or 16,
   wherein the random access configuration periods are time intervals at which random access resources repeatedly occur, and
   wherein the random access association period is a time in which a quantity of the random access resources are associated with the respective synchronization signal block.

2. The apparatus according to claim 1, wherein the value of X is related to a quantity of the at least one synchronization signal block.

3. The apparatus according to claim 1, wherein the value of X is related to a quantity of random access occasions comprised in one random access configuration period P.

4. The apparatus according to claim 1, wherein a value of the random access association period Y is 10 ms, 20 ms, 40 ms, 80 ms, 160 ms, 320 ms, or 640 ms.

5. The apparatus according to claim 1, wherein any remaining random access occasions in the random access association period Y are not used for accessing a network device.

6. The apparatus according to claim 1, wherein any remaining random access occasions in the random access association period Y are not associated with any synchronization signal block or any synchronization signal block group.

7. The apparatus according to claim 1, wherein a quantity of random access occasions in one random access configuration period P is 1, 2, 4, or 8.

8. The apparatus according to claim 1, wherein the RACH configuration information comprises a physical random access channel configuration index (PRACH) configuration index and a random access preamble subcarrier spacing.

9. The apparatus according to claim 8, wherein the PRACH configuration index indicates one or more of:
   a preamble format, a random access configuration period, a frame in which a random access resource is located, a subframe index, or a start orthogonal frequency division multiplexing (OFDM) symbol.

10. The apparatus according to claim 1, wherein a maximum quantity of synchronization signal blocks mapped to one random access occasion is 8 or 16.

11. The apparatus according to claim 1, wherein when a quantity of synchronization signal blocks associated with one random access occasion is N, and a quantity of contention-based or non-contention-based or all random access preambles in one random access occasion is N1, a quantity N2 of random access preambles mapped to one synchronization signal block is no more than floor(N1/N) or N1/N, wherein floor indicates rounding down to a nearest integer; wherein
   a value of N1 is any one or more values of 4, 8, 12, 16, 20, 24, 28, 32, 36, 40, 44, 48, 52, 56, 60, 64, 128, or 256.

12. The apparatus according to claim 1, wherein the one or more processors are further configured to execute the instructions to cause the apparatus to:
   determine a granularity of a quantity of random access preambles based on a quantity of synchronization signal blocks mapped to one random access occasion, wherein the random access preambles are used to access a network device.

13. The apparatus according to claim 1, wherein in one random access association period Y, synchronization signal blocks or synchronization signal block groups are cyclically mapped to random access occasions.

14. The apparatus according to claim 1, wherein in different random access association periods Y, a first random access occasion is mapped to a first synchronization signal block.

15. The apparatus according to claim 1, wherein the value of X is 1.

16. A communications method, comprising:
   receiving, by a terminal, at least one synchronization signal block, information used to indicate a mapping relationship between a respective synchronization signal block and a random access occasion, and random access channel (RACH) configuration information; and
   determining, by the terminal, a random access association period Y based on the information received by the terminal,
   the random access association period Y comprising X random access configuration periods P, and a value of X being any one of 2, 4, 8, or 16,
   the random access configuration periods being time intervals at which random access resources repeatedly occur, and the random access association period being a time in which a quantity of the random access resources are associated with the respective synchronization signal block.

17. The method according to claim 16, wherein the value of X is related to a quantity of the at least one synchronization signal block.

18. The method according to claim 16, wherein the value of X is further related to a quantity of random access occasions comprised in one random access configuration period P.

19. The method according to claim 16, wherein a value of the random access association period Y is 10 ms, 20 ms, 40 ms, 80 ms, 160 ms, 320 ms, or 640 ms.

20. The method according to claim 16, wherein any remaining random access occasions in the random access association period Y are not used for accessing a network device.

21. The method according to claim 16, any remaining random access occasions in the random access association period Y are not associated with any synchronization signal block or any synchronization signal block group.

22. The method according to claim 16, wherein a quantity of random access occasions in one random access configuration period P is 1, 2, 4, or 8.

23. The method according to claim 16, wherein the value of X or Y is related to:
    a quantity of actually transmitted synchronization signal blocks or synchronization signal block groups, a quantity of synchronization signal blocks or synchronization signal block groups mapped to one random access occasion, and a quantity of random access occasions comprised in a random access configuration period P.

24. The method according to claim 16, wherein a maximum quantity of synchronization signal blocks mapped to one random access occasion is 8 or 16.

25. The method according to claim 16, wherein when a quantity of synchronization signal blocks mapped to one random access occasion is N, and a quantity of contention-based or non-contention-based or all random access preambles in one random access occasion is N1, a quantity N2 of random access preambles mapped to one synchronization signal block is no more than floor(N1/N) or N1/N, floor indicating rounding down to a nearest integer;
    a value of N1 being any one or more values of 4, 8, 12, 16, 20, 24, 28, 32, 36, 40, 44, 48, 52, 56, 60, 64, 128, or 256.

26. The method according to claim 16, wherein the method further comprises:
    determining a granularity of a quantity of random access preambles based on a quantity of synchronization signal blocks mapped to one random access occasion, the random access preambles being used to access a network device.

27. The method according to claim 16, wherein in one random access association period Y, synchronization signal blocks or synchronization signal block groups are cyclically mapped to random access occasions.

28. The method according to claim 16, wherein in different random access association periods, a first random access occasion is mapped to a first synchronization signal block.

29. The method according to claim 16, wherein the RACH configuration information comprises a physical random access channel configuration index (PRACH) configuration index and a random access preamble subcarrier spacing.

30. The method according to claim 29, wherein the PRACH configuration index indicates one or more of:
    a preamble format, a random access configuration period, a frame in which a random access resource is located, a subframe index, or a start orthogonal frequency division multiplexing (OFDM) symbol.

31. The method according to claim 16, wherein the value of X is 1.

* * * * *